US010269024B2

(12) United States Patent
Kaib et al.

(10) Patent No.: US 10,269,024 B2
(45) Date of Patent: Apr. 23, 2019

(54) SYSTEMS AND METHODS FOR IDENTIFYING AND MEASURING TRENDS IN CONSUMER CONTENT DEMAND WITHIN VERTICALLY ASSOCIATED WEBSITES AND RELATED CONTENT

(75) Inventors: Paul Edward Kaib, Atlanta, GA (US); Brent Allen Walker, Marietta, GA (US); Joshua Michael Hofmann, Atlanta, GA (US); Gregg Freishtat, Atlanta, GA (US)

(73) Assignee: Outbrain Inc., New York, NY (US)

( * ) Notice: Subject to any disclaimer, the term of this patent is extended or adjusted under 35 U.S.C. 154(b) by 553 days.

(21) Appl. No.: 12/367,968

(22) Filed: Feb. 9, 2009

(65) Prior Publication Data
US 2009/0204478 A1    Aug. 13, 2009

Related U.S. Application Data

(60) Provisional application No. 61/027,187, filed on Feb. 8, 2008.

(51) Int. Cl.
G06Q 30/02    (2012.01)
(52) U.S. Cl.
CPC ......... *G06Q 30/02* (2013.01); *G06Q 30/0201* (2013.01)
(58) Field of Classification Search
CPC ... G06Q 30/02; G06Q 30/0201; G06Q 10/063
(Continued)

(56) References Cited

U.S. PATENT DOCUMENTS 5,953,718 A *   9/1999  Wical
6,446,076 B1 *  9/2002  Burkey ............... G06F 9/4443
                                        704/270

(Continued)

FOREIGN PATENT DOCUMENTS

JP    2008225781    9/2008
KR    20020018321    3/2002
KR    20030003396    1/2003

OTHER PUBLICATIONS

Enhancing Search Engine Performance Using Expert Systems—Stan Lovic, Meiliu Lu, and Du Zhang Intel Corp, 2006.*
(Continued)

*Primary Examiner* — Timothy Padot
*Assistant Examiner* — Darlene Garcia-Guerra
(74) *Attorney, Agent, or Firm* — Lowenstein Sandler LLP

(57) ABSTRACT

Embodiments of the invention can provide systems and methods for identifying and measuring trends in consumer content demand within a vertical network of websites and related content. In one embodiment, a method can include receiving content from webpages in at least one vertical; receiving data associated with a plurality of selected keywords associated with the at least one vertical, wherein one or more associations between at least a portion of the plurality of selected keywords can be generated; receiving session data associated with a plurality of consumers accessing content in webpages in the at least one vertical; determining third party data associated with the plurality of consumers accessing at least a portion of webpages comprising at least one of the selected keywords; and aggregating, based at least in part on the third party data, session data associated with visits to the webpages comprising at least one of the selected keywords.

15 Claims, 13 Drawing Sheets

(58) Field of Classification Search
USPC ........ 705/10, 14.4, 14.41, 14.42, 14.43, 7.11
See application file for complete search history.

(56) References Cited

U.S. PATENT DOCUMENTS

| | | | |
|---|---|---|---|
| 6,665,658 B1* | 12/2003 | DaCosta et al. | |
| 6,839,680 B1* | 1/2005 | Liu et al. | 705/7.33 |
| 7,043,450 B2 | 5/2006 | Velez et al. | |
| 7,260,568 B2 | 8/2007 | Zhang et al. | |
| 7,260,774 B2 | 8/2007 | Lambert et al. | |
| 7,295,996 B2 | 11/2007 | Skinner | |
| 7,428,529 B2 | 9/2008 | Zeng et al. | |
| 7,702,635 B2 | 4/2010 | Horvitz et al. | |
| 7,730,509 B2 | 6/2010 | Boulet et al. | |
| 7,752,190 B2 | 7/2010 | Skinner | |
| 7,865,394 B1* | 1/2011 | Calloway | G06Q 10/107 370/252 |
| 8,146,126 B2 | 3/2012 | Downey et al. | |
| 8,219,550 B2 | 7/2012 | Merz et al. | |
| 8,271,495 B1 | 9/2012 | Skrenta et al. | |
| 2002/0042793 A1* | 4/2002 | Choi | G06F 17/30687 |
| 2002/0042821 A1* | 4/2002 | Muret et al. | 709/223 |
| 2002/0063735 A1* | 5/2002 | Tamir et al. | 345/745 |
| 2003/0023715 A1* | 1/2003 | Reiner et al. | 709/224 |
| 2003/0105677 A1 | 6/2003 | Skinner | |
| 2003/0171977 A1* | 9/2003 | Singh et al. | 705/10 |
| 2003/0220918 A1 | 11/2003 | Roy et al. | |
| 2004/0059997 A1* | 3/2004 | Allen et al. | 715/501.1 |
| 2004/0199491 A1* | 10/2004 | Bhatt | 707/2 |
| 2004/0216034 A1 | 10/2004 | Lection et al. | |
| 2005/0065777 A1* | 3/2005 | Dolan et al. | 704/10 |
| 2005/0080780 A1* | 4/2005 | Colledge et al. | 707/4 |
| 2005/0160002 A1* | 7/2005 | Roetter | G06Q 30/02 705/14.42 |
| 2005/0198020 A1* | 9/2005 | Garland et al. | 707/3 |
| 2005/0234972 A1 | 10/2005 | Zeng et al. | |
| 2006/0010029 A1* | 1/2006 | Gross | 705/10 |
| 2006/0036400 A1* | 2/2006 | Kasriel | G06F 17/3089 702/182 |
| 2006/0041553 A1* | 2/2006 | Paczkowski et al. | 707/7 |
| 2006/0085280 A1* | 4/2006 | Murnan | G06F 17/30864 705/26.1 |
| 2006/0149624 A1* | 7/2006 | Baluja | G06Q 30/0255 705/14.53 |
| 2006/0174209 A1* | 8/2006 | Barros | G06F 3/0483 715/764 |
| 2006/0200434 A1* | 9/2006 | Flinn | G06N 99/005 706/12 |
| 2006/0200556 A1* | 9/2006 | Brave | G06F 17/30867 709/224 |
| 2007/0027770 A1* | 2/2007 | Collins et al. | 705/14 |
| 2007/0027865 A1* | 2/2007 | Bartz et al. | 707/5 |
| 2007/0050393 A1* | 3/2007 | Vogel | G06F 17/30864 |
| 2007/0061313 A1* | 3/2007 | Kahle et al. | 707/3 |
| 2007/0083611 A1* | 4/2007 | Farago | G06Q 30/02 709/217 |
| 2007/0088609 A1* | 4/2007 | Reller | G06Q 30/02 705/14.71 |
| 2007/0094250 A1* | 4/2007 | Kapur | 707/5 |
| 2007/0100811 A1* | 5/2007 | Error et al. | 707/4 |
| 2007/0162379 A1 | 7/2007 | Skinner | |
| 2007/0250901 A1* | 10/2007 | McIntire | H04N 7/17318 725/146 |
| 2007/0288256 A1* | 12/2007 | Speier | G06Q 10/10 715/208 |
| 2007/0294230 A1 | 12/2007 | Sinel et al. | |
| 2008/0059453 A1* | 3/2008 | Laderman | 707/5 |
| 2008/0086741 A1* | 4/2008 | Feldman et al. | 725/13 |
| 2008/0114739 A1* | 5/2008 | Hayes | 707/3 |
| 2008/0189408 A1* | 8/2008 | Cancel et al. | 709/224 |
| 2008/0214157 A1* | 9/2008 | Ramer | G06F 17/30749 455/414.1 |
| 2008/0215541 A1* | 9/2008 | Li | G06F 17/30864 |
| 2008/0215607 A1 | 9/2008 | Kaushansky et al. | |
| 2008/0221987 A1* | 9/2008 | Sundaresan et al. | 705/14 |
| 2008/0235106 A1* | 9/2008 | Reisman | 705/26 |
| 2008/0243812 A1 | 10/2008 | Chien et al. | |
| 2008/0262908 A1* | 10/2008 | Broady et al. | 705/14 |
| 2009/0024468 A1* | 1/2009 | Broder | G06Q 30/02 705/14.43 |
| 2009/0024915 A1 | 1/2009 | Cudich et al. | |
| 2009/0037412 A1 | 2/2009 | Bard et al. | |
| 2009/0089141 A1* | 4/2009 | Lara et al. | 705/10 |
| 2009/0089310 A1* | 4/2009 | Lara et al. | 707/102 |
| 2009/0112974 A1 | 4/2009 | Ravikumar et al. | |
| 2009/0129377 A1* | 5/2009 | Chamberlain et al. | 370/389 |
| 2009/0158342 A1 | 6/2009 | Mercer et al. | |
| 2009/0234745 A1* | 9/2009 | Ramer | G06F 17/30749 705/14.23 |
| 2009/0319518 A1 | 12/2009 | Koudas et al. | |
| 2010/0030597 A1 | 2/2010 | Lewis et al. | |
| 2011/0202827 A1 | 8/2011 | Freishtat et al. | |
| 2011/0213655 A1 | 9/2011 | Henkin et al. | |
| 2011/0238495 A1 | 9/2011 | Kang | |
| 2011/0246601 A1* | 10/2011 | Murray et al. | 709/217 |
| 2011/0289143 A1 | 11/2011 | Polis et al. | |
| 2012/0095976 A1 | 4/2012 | Hebenthal et al. | |

OTHER PUBLICATIONS

Australian Online Newspapers: A Website Content Analysis Approach to Measuring Interactivity, Lina Hashim, Helen Hasan, Suku, Sinnapan, AIS Electronic Library, ACIS 2007 Proceedings (Year: 2007).*

Basu, S., "Ditching Evernote? Check Out 5 Free Web Clipping Alternatives," © Mar. 24, 2010, downloaded from <http://www.makeuseof.com/tag/ditching-evernote-check-5-free-web-clipping-alternatives/>, 9 pages.

Red Oak, "Web Clipper datasheet," © 2006, Red Oak Software, Inc., 2 pages.

Lingam et al., "Supporting End-Users in the Creation of Dependable Web Clips," WWW 2007, May 8-12, ACM, pp. 953-962.

Irmak et al., "Interactive Wrapper Generation with Minimal User Effort," in WWW2003, May 20-24, 2003, ACM, 2 pages.

Kuhlins et al., "Toolkits for Generating Wrappers, A survey of software toolkits for automated data extraction from web sites," © 2002, pp. 1-15.

Freire et al., "WebViews: Accessing Personalized Web Content and Services," © 2001, ACM, pp. 576-586.

Huck et al., "Jedi: Extracting and Synthesizing Information from the Web," © 1998 In Intl. Conf. of Cooperative Info. Systems, 10 pages.

Kowalkiewicz et al., "Towards more personalized Web: Extraction and integration of dynamic content from the Web," © 2006, In Asia Pacific Web Conference, 12 pages.

Fujima et al., "Clip, Connect, Clone: Combining Application Elements to Build Custom Interfaces for Information Acces," © 2004, ACM, pp. 175-184.

Sahuguet et al., "Building light-weight wrappers for legacy Web data-sources using W4F," © 1999 Proc. 25th VLDB Conf., 4 pages.

Laender et al., "A Brief Survey of Web Data Extraction Tools," Jun. 2002, SIGMOD Record, vol. 31, No. 2, pp. 84-93.

Sugiura et al., "Internet Scrapbook: Automating Web Browsing Tasks by Demonstration," 1998, ACM, pp. 9-18.

PCT International Search Report and Written Opinion for International Application No. PCT/US2010/043925 dated Mar. 22, 2011, 10 pages.

USPTO Office Action for U.S. Appl. No. 12/647,304 dated Apr. 4, 2012.

USPTO Office Action for U.S. Appl. No. 12/647,304 dated Jul. 5, 2012.

USPTO Office Action for U.S. Appl. No. 12/647,304 dated Apr. 12, 2013.

USPTO Office Action for U.S. Appl. No. 12/965,417 dated Mar. 29, 2012.

USPTO Office Action for U.S. Appl. No. 12/965,417 dated Oct. 22, 2012.

USPTO Office Action for U.S. Appl. No. 12/965,427 dated Oct. 4, 2012.

(56) References Cited

OTHER PUBLICATIONS

USPTO Office Action for U.S. Appl. No. 12/965,440 dated Mar. 13, 2013.
USPTO Office Action for U.S. Appl. No. 12/965,455 dated Jun. 29, 2012.
USPTO Office Action for U.S. Appl. No. 12/965,455 dated Apr. 24, 2013.
USPTO Office Action for U.S. Appl. No. 12/965,427 dated Aug. 1, 2013.
USPTO Office Action for U.S. Appl. No. 12/965,440 dated Sep. 5, 2013.

* cited by examiner

US 10,269,024 B2

SYSTEMS AND METHODS FOR IDENTIFYING AND MEASURING TRENDS IN CONSUMER CONTENT DEMAND WITHIN VERTICALLY ASSOCIATED WEBSITES AND RELATED CONTENT

RELATED APPLICATION

This application claims priority to U.S. Ser. No. 61/027,187, entitled "Systems and Methods for Identifying and Measuring Trends in Consumer Content Demand Within Vertically Associated Websites", filed Feb. 8, 2008, the contents of which are hereby incorporated by reference.

FIELD OF THE INVENTION

The invention generally relates to analyzing consumer behavior, and more particularly, to systems and methods for identifying and measuring trends in consumer content demand within vertically associated websites and related content.

BACKGROUND OF THE INVENTION

Some companies provide web analytics tools and products for website owners to analyze consumer behavior on the Internet. Examples of such products include Google Analytics and web analytics products provided by Omniture. One technique used by some web analytics tools and products is to apply one or more JavaScript™ tags to each webpage within a particular website of interest, or alternatively, in a footer of various webpages within a website of interest. These tags signal a server to monitor consumer attributes while a consumer is visiting the website via an Internet browser or other similar viewing tool, such as what he or she clicks on, which webpages he or she navigates to, etc. The code typically monitors each visitor to the website by placing a cookie on each consumer's computer. Some or all of the monitored consumer behavior can be aggregated by respective IP (Internet Protocol) and URL (uniform resource locator) addresses to provide consumer usage statistics to the website's owner or host for some or all visitors to the website. The website owner may access the statistics and any associated reports through an Internet browser-based interface, e-mail based reports, private client consumer interface, or data feed to monitor activity on his or her website.

Other companies offer industry-based consumer data for usage of the Internet. Examples of such companies include ComScore, Quantcast, Hitwise, Nielson Online, and Compete.com. Typically these companies measure consumer behavior by combining data from one or more Internet service providers (ISPs) with panel-type data, direct site measurement through a JavaScript tag, or data from one or more selected consumers who allow a company to track their behavior by way of an application program, which may be installed on their computer or operating in conjunction with their Internet browser, or by way of routing the data through a proxy. This data is then aggregated to offer consumer trend data at the site level, such as the number of visitors to automotive sites in a given period of time or the search terms consumers used to locate those automotive sites. Multiple sites can be grouped together into an industry category to look at overall traffic patterns to a specific industry; however these companies cannot aggregate and measure product level trend data across multiple sites beyond search term frequency. An example of this would be aggregating all web traffic to web content containing a specific car model for a given period of time, in addition to the search terms used to locate that specific car model (if a consumer used a search engine to find that specific webpage).

Additional companies such as Nielsen BuzzMetrics focus on mining the text on web pages from social networking sites such as MySpace, and other types of blogs, for the purposes of measuring consumer sentiment and the growth rate of content around a specific topic or keyword. These companies utilize different methods of natural language processing to identify topics or keywords within blog content. While this data can be aggregated to determine the 'growth rate' or 'mention rate' of specific keywords, current methods cannot determine the actual number of consumer visits to the blog web pages and social network web pages where those keywords were found.

Thus, conventional tools focus either on consumer demographics and website traffic statistics (at the site level), such as site rankings, or the growth rate and consumer sentiment around specific keywords, which in some instances may not be useful or particularly relevant measures of consumer interest in or demand for specific content.

Therefore, a need exists for systems and methods for identifying and measuring trends in consumer content demand within vertically associated websites and related content.

SUMMARY OF THE INVENTION

Embodiments of the invention can provide some or all of the above needs. Certain embodiments of the invention can provide systems and methods for identifying and measuring trends in consumer content demand within vertically associated websites and related content, such as music, automotive, or consumer electronics. In one embodiment, a system can identify any number of keyword or subject occurrences within any number of webpages by utilizing a dictionary of industry-related keywords or subjects in conjunction with, for example, natural language processing techniques. In another embodiment, a system can measure consumer traffic to one or more web pages where particular subjects were found using, for example, JavaScript tags. In yet another embodiment, a variety of techniques and algorithms can be used to combine both the resulting data from the identification of keyword or subject occurrences with the consumer traffic data to the corresponding web pages where those keywords or subjects were located. In this manner, trend data can be obtained around a specific keyword or subject and aggregated across multiple websites, or a vertical category across those websites. Examples of trend data can include, but are not limited to:

(1) Occurrence—how many times does a product or brand appear and on what types of sites and pages;

(2) Geographics—in which geographic locations is a specific product or brand most popular based on consumer views of that product;

(3) Velocity—what is the growth rate of a product or brand being mentioned, as well as consumed (actual views), and on what types of pages;

(4) Engagement—how many seconds does a consumer remain engaged with a product or brand;

(5) Reach—how many consumers is a product or brand reaching during a given period of time; and (6) Location—what types of web pages and sites does a product perform the best based on increases in page views or engagement time.

In one embodiment, a method for identifying and measuring trends in consumer content demand within vertically associated websites or related content can be provided. The method include receiving, from a crawler, content from a plurality of webpages in at least one vertical. The method can include receiving, from a processor, data associated with a plurality of selected keywords associated with the at least one vertical, wherein one or more associations between at least a portion of the plurality of selected keywords can be generated. In addition, the method can include receiving, from a processor, session data associated with a plurality of consumers accessing content in webpages in the at least one vertical. Furthermore, the method can include determining third party data associated with the plurality of consumers accessing at least a portion of webpages comprising at least one of the selected keywords. Moreover, the method can include aggregating, based at least in part on the third party data, session data associated with visits to the webpages comprising at least one of the selected keywords.

In another embodiment, a system for identifying and measuring a trend in consumer content demand within vertically associated websites and related content can be provided. The system can include a crawler operable to receive content from a plurality of webpages in at least one vertical. The system can also include a vertical domain model module operable to receive data associated with a plurality of selected keywords associated with the at least one vertical, wherein one or more associations between at least a portion of the plurality of selected keywords can be generated. In addition, the system can include a tracking and recording application operable to receive session data associated with a plurality of consumers accessing content in webpages in the at least one vertical, and determine third party data associated with the plurality of consumers accessing at least a portion of webpages comprising at least one of the selected keywords. Furthermore, the system can include a data integration service module operable to aggregate, based at least in part on the third party data, session data associated with visits to the webpages comprising at least one of the selected keywords.

Other systems and processes according to various embodiments of the invention will become apparent with respect to the remainder of this document.

BRIEF DESCRIPTION OF THE DRAWINGS

Reference will now be made to the accompanying drawings and exhibits, which may not necessarily be drawn to scale, and wherein.

DETAILED DESCRIPTION OF EMBODIMENTS

Figure 1:
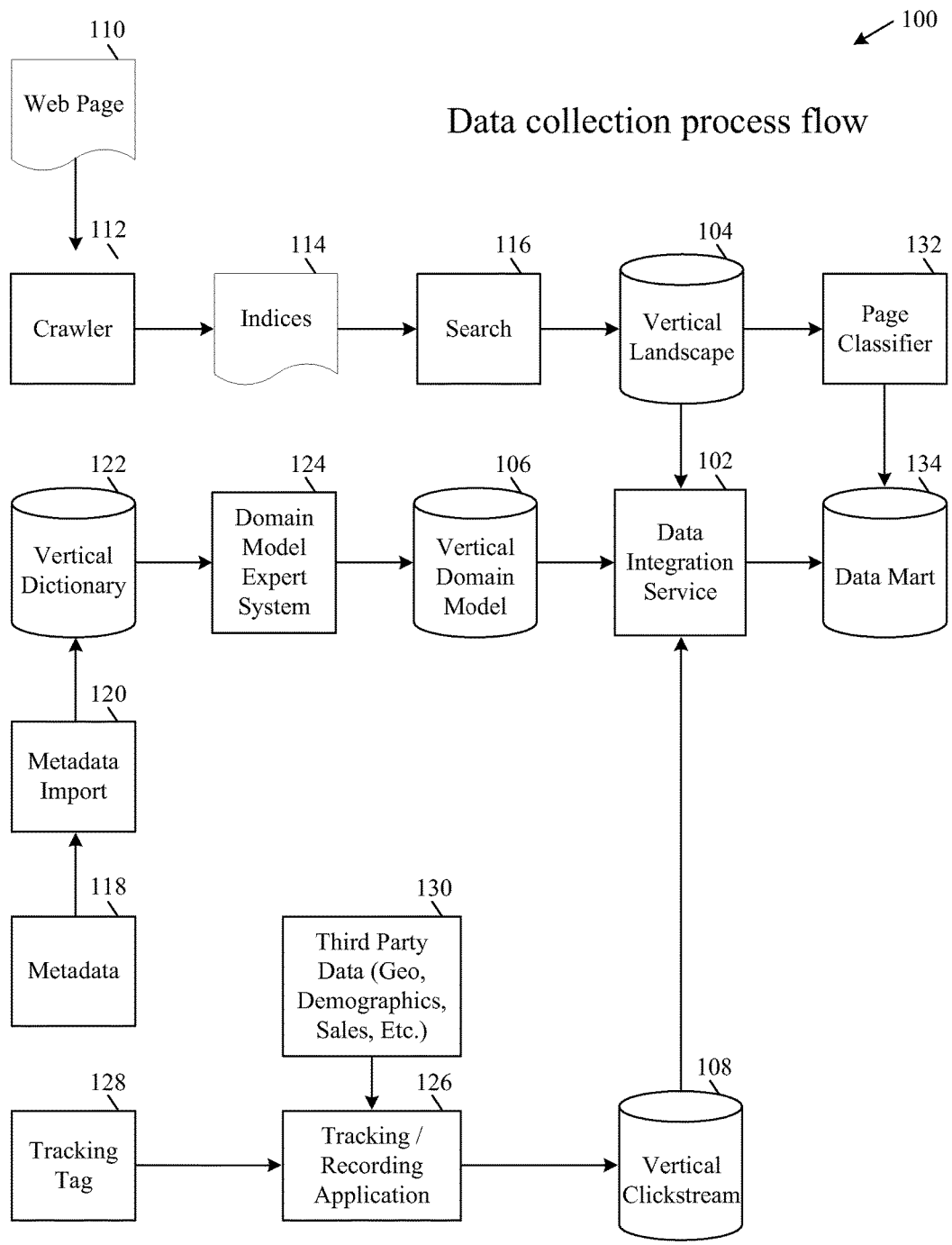
FIG. 1 illustrates a schematic view of an example data flow in accordance with an embodiment of the invention.

The invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will convey the scope of the invention. Like numbers refer to like elements throughout.

As used herein, the term "vertical" should be construed to describe any group related by industry or market place. Thus, the term "vertically associated websites" or "vertically associated categories" should be construed to mean a group of websites or content sections with content related to the same or a similar industry or market place.

The terms "V-tag" and "tag", and their respective pluralized forms are used interchangeably throughout the description, should be construed to cover any type of code, string, command, or any combination thereof, which can be inserted or otherwise included in or on a webpage or a website.

The term "content" should be construed to describe any form of data or information presented by, posted on, or otherwise accessible from a webpage or website.

The term "dictionary" and its pluralized form are used interchangeably throughout the description, and should be construed to describe any collection of data, information, text, alphanumeric text, words, phrases, keywords, key-phrases, terms, industry-specific words, market place-specific words, vertical-specific words, or new words within an industry, market place, or vertical.

The term "vertical domain model" refers to the one or more relationships between data elements in a dictionary associated with a vertical, market place, or industry. For example, an artist in the music industry may be related to one or more music genres, or may potentially be in multiple bands. Thus, multiple relationships can exist for any particular element, such as an artist, within a vertical domain model.

The term "vertical landscape" refers to a collection of data describing the occurrence of one or more vertical domain model terms within one or more webpages retrieved by a web crawler. Using a music industry example, the associated vertical landscape could be the combination of occurrences of an artist, classified by a genre, which was found on a classified page type. The combined data set of artist, genre, and page type may be the result of finding associated keywords and applying a suitable vertical domain model to those keywords.

The term "consumer" and its pluralized form should be construed to cover any entity or person accessing or otherwise requesting content from a webpage or a website.

The term "user" and its pluralized form should be construed to cover any entity or person obtaining one or more reports or output from a system or method in accordance with an embodiment of the invention.

The terms "clicksession data" and "session data" should be construed to describe any data or information characterizing a consumer's experience in accessing a webpage or website including, but not limited to, click data such as URL and IP, alphanumeric text input by a consumer, browser type, and time associated with any consumer activity in accessing or otherwise requesting content from a webpage or a website.

The term "engagement time" should be construed to describe the period of active time a consumer spends viewing, accessing, reading about, or listening to particular content on a webpage or website based at least in part on mouse movement, browser focus, and user scrolling, or any other detectable action such as audio or video playback. Thus, engagement time can be a measure of consumer activity specific to a subject.

The term "indices" should be construed to describe any device or method of collecting, parsing and storing data to facilitate fast and accurate information retrieval. For example, indices can be indicators within a search result, which permit retrieval of particular data by reference to one or more corresponding indicators.

The term "private" should be construed to describe restricted access to aggregated data for a particular webpage or website or set of webpages or websites. For example, a "private set of webpages" can be a set of webpages with restricted access to aggregated data for only a predefined owner, author, administrator, or host of a particular set of webpages or websites.

The term "computer-readable medium" describes any form of memory and/or a propagated signal transmission medium. In certain instances, propagated signals representing data and computer-executable instructions can be transferred between network devices and systems. In other instances, a computer-executable instructions can be stored on a computer-readable medium, and the instructions can be implemented by a processor-based device.

Some or all embodiments of the invention can provide systems and methods for identifying and measuring trends in consumer content demand within a vertical network of websites and related content. Various embodiments of the invention can aggregate usage data across a vertical network of like websites and related content, such as by industry or interest group, by uniquely combining various technologies and methods. Numerous constituencies may be interested in such data, for instance, in the music industry, interested parties can include, but are not limited to, content owners and publishers, website owners and hosts, artists and music labels, digital marketing resources, public relation firms, marketing agencies and personnel, promoters, band managers, and concert venue owners. Other embodiments of the invention can be utilized for other constituencies and interested parties in other industries or verticals including, but not limited to, automobiles, vehicles, consumer products, entertainment, motion pictures, pharmaceuticals, clothing and apparel, and financial products and services.

One embodiment of the invention utilizes one or more V-tags or tags across a group of related websites, by vertical or industry, to collect and aggregate consumer session data. A crawl of some or all of those websites collects crawl job data including occurrences of one or more vertical or industry-specific keywords in associated webpages and dynamically classifies the website content, including for instance, site and page type classifications, such as an item details page or a check-out page. Some or all of the consumer session data can be combined with the crawl job data, and contextual analysis of various keywords and page types can be performed. In this manner, consumer content consumption can be tracked by keywords of interest, typically predefined by one or more vertical or industry-specific domain models.

As an example, a system embodiment can crawl webpages from one or more websites for one or more keywords of interest, typically based on keywords in one or more predefined vertical or industry-specific dictionaries. The system embodiment can record the keywords of interest that may occur on any webpage within the set of websites associated within a vertical or industry, such as a vertical or industry category and related sub-categories. Job crawl data collected and stored by the system embodiment can include, but is not limited to, a URL associated with the webpage or website, date, keyword, site and page type classifications, and time of keyword occurrence. If a particular keyword occurs on a website that has been tagged with a V-tag or tag, a data record for that keyword can be combined with consumer session data collected from that website using the same URL or other assigned unique identifier. In this manner, for every webpage that contains, for instance an artist's name, such as "Sting", aggregate consumer demand statistics can be determined for the particular keyword. Some examples of aggregate consumer demand statistics can include, but are not limited to, how many times a keyword of interest was viewed on a particular webpage or website, and the average amount of time (also referred to herein as engagement time) a consumer spent on a webpage or website with a keyword of interest. Trends for particular categories can be tracked through keywords that have been classified into particular categories of interest. For instance, since "Sting" is in the rock music genre, aggregate consumer demand usage data for all artists in the rock music genre can be collected and aggregate statistics can be reported for the genre, or any other category.

Various embodiments of the invention can also provide filtering of certain consumer activities from collected data, and thus can improve measuring average consumer engagement time by keyword or category. For example, when certain consumer activities are filtered from collected data, such as activities which indicate a consumer is no longer viewing a particular webpage where a keyword of interest occurs, the remaining data indicative of the consumer's behavior with respect to the keyword of interest can be processed and analyzed. Other activities, for example, launching new tabs or Internet browser windows while a current window remains open as well as periods of inactivity for older windows or associated application programs in the older windows, can be filtered from collected data. Therefore, in these embodiments, a relatively higher degree of accuracy for measuring a consumer's engagement time for a particular keyword, such as an artist, brand, product, etc., across a vertical network of associated websites can be achieved. For instance, using an embodiment of the invention, relatively detailed measurements can be made, such as consumers spend an average of about 25 seconds reading about "Sting" across the top 50 music websites.

Various embodiments of the invention can also be implemented to analyze aggregate consumer data for a private network of websites. For example, an embodiment of the invention can be implemented for a private network associated with an entity's local television station websites to view aggregate usage statistics across the entity's properties for the United States by show. In another example, a national radio network such as Cox Radio or ClearChannel could implement the technology on all local radio station websites to view aggregate usage statistics across their particular websites for the United States by genre, artist, or state. No known technology exists today that aggregates Internet usage data for both contextual analysis and trend analysis across a private network of websites.

In some instances, the usage of certain keywords in webpages of interest may utilize different punctuation, grammar, and spelling than what may be contained in a dictionary for a particular industry or vertical. For example, the keyphrase "Porsche 911" might show up as "Porsche Carrara", "Porsche Carrera", "911 Carrera", "Porshe 911", or any number of variations. Similar examples can apply to other keywords or keyphrases including, but not limited to, artists, products, and titles. In at least one embodiment, one or more algorithms can be utilized to search for, record, and update one or more dictionaries for a related industry or vertical, wherein each dictionary can include one or more self-taught classifications. Such algorithms can address variations in punctuation, grammar, and spelling, and some or all of the algorithms can include or otherwise implement self-learning techniques and methodologies to improve the identification of variations and modification or addition of new classifications as needed.

In other instances, webpages of interest may contain multiple keywords. For example, a music industry index webpage may list 50 artists, which may have corresponding keywords for each respective artist. In at least one embodiment, some or all of these types of webpages can be filtered from collected data when determining engagement time of a consumer so that the amount of time a particular consumer spends on the webpage is not divided among all of the multiple keywords on the webpage, such as among 50 keywords corresponding to 50 artists appearing on a music industry webpage.

In FIG. 1, an example schematic of a data flow 100 in accordance with an embodiment of the invention is shown. The data flow 100 can facilitate identifying and measuring trends in consumer content demand within a vertical network of websites and related content. Unexpected improvements in identifying and measuring trends in consumer content demand within a vertical network of websites and related content can be achieved by way of various embodiments of the data flow 100 described herein. The data flow 100 is shown by way of example, and in other embodiments, similar or different data flow components, data flow inputs, and data flow outputs may exist. In the example shown in FIG. 1, the data flow 100 can be facilitated by a data integration service module 102. Data handled or otherwise received by the data integration service module 102 can include any number of and different types of data streams and data sources, such as crawled webpage data from a vertical landscape mart 104, data from a vertical domain model database 106, and click data from a vertical clickstream mart 108.

In the example shown in FIG. 1, content from at least one web page 110 can be obtained by an associated web crawler 112, also known as a "bot". In one embodiment, a web crawler, such as 112, can be a software and/or hardware program or set of computer-executable instructions associated with the host server or other processor-based device or system. Data collected by or otherwise received by the web crawler 112 can include, but is not limited to, displayed content within the web page and links from the page to other pages or content. webpage. A web crawler, such as 112, can crawl some or all of the content of a website and can record the crawled content of some or all of the webpages of the website. Once the crawl data has been collected, one or more corresponding indices 114 can be created during a search 116 of one or more vertical domain model elements, or subsequent crawls of new or updated webpages by the web crawler 112. Search results and corresponding indices 114 can be stored in a data storage device, such as a vertical landscape mart 104, which may be organized by website URL (universal resource locator) or by other location information.

In some instances, a web crawler 112 can be instructed to crawl a portion of or a specified portion of a website. For example, one or more URL fragments can be identified to be crawled within one or more websites within a specific vertical. In this example, some or all of the keyword instances located by the subsequent search of the content retrieved by the web crawler in a crawl of the associated webpages of the selected websites can be stored in a vertical landscape mart 104 or other data storage device. Various keyword characteristics can be collected and stored including, but not limited to, the number of occurrences of each keyword, and the location of those occurrences by URL.

In at least one embodiment, multiple vertical landscape marts or data storage devices, similar to 104, can be implemented in the data flow 100, wherein each vertical landscape mart or data storage device can be associated with a respective vertical.

In another embodiment, a single vertical landscape mart 104 or data storage device can be organized by way of one or more verticals, wherein each vertical can include one or more website URLs for associated entities within the respective vertical.

Another data stream shown in the example of FIG. 1 is metadata stored in a vertical domain model database 106. Using any number of collection processes and/or associated devices, metadata 118 can be obtained or otherwise received. In the embodiment shown in FIG. 1, at least one metadata import engine 120 can be implemented to allow one or more dictionaries to be imported for storage in a vertical dictionary database 122. One suitable metadata import engine is a metadata loader, which can be any combination or number of software and/or hardware-implemented processes or devices. A suitable dictionary can include, but is not limited to, a dictionary of keywords, a collection of new industry-specific words, and a vertical-specific dictionary. In one embodiment, an example of a suitable dictionary can be a music industry dictionary containing some or all of the names of artists, albums, and song titles, which may be in current circulation with a valid ISRC (International Standard Recording Code). In another embodiment, an example of a suitable dictionary can be an automotive industry dictionary containing makes and models of some or all vehicles ever produced with some or all of the features and/or options associated with those vehicles. Other embodiments can include similar or different types of dictionaries, data stores, or files including words, keywords, or information associated with at least one vertical.

In at least one embodiment, a domain model expert system module 124 can apply or otherwise input expert or other specialized knowledge or observations against data or information in the vertical dictionary 122. In this manner, the vertical dictionary 122 can be supplemented with one or more inferences associated with any number of relationships between elements within the dictionary 122. For example, knowledge or observations that "Sting was a member of The Police" and "Sting sang the song 'Roxanne' within the rock genre" can be input to the vertical dictionary 122. The resulting data sets, which can include one or more vertical domain models, from the domain model expert system module 124 can be stored within the vertical domain model database 106. In another embodiment, an example of a suitable domain model expert system module can supplement an automotive industry dictionary with one or more inferences associated with any number of relationships between elements within the dictionary. For example, knowledge or observations that the "911 Carrerra is a model of Porsche" and that "there are various model 911 Carrerras including the 'S', 'Cabriolet', and '4'".

After one or more dictionaries have been appended with additional data from the domain model expert system module 124 and stored in the vertical domain model database 106, the search device or process 116 can utilize some or all of the data stored in the database 106 along with one or more generated indices 114 to identify one or more keywords contained within the crawled webpages. For example, each vertical may have a respective domain model used by the search device or process 116 to identify one or more keywords in the web pages and stored within the indices 114 resulting from a prior search or crawl by the web crawler 110. Each time a particular keyword is located by the search device or process 116, certain characteristics such as the URL and the number of times the keyword is located can be stored or otherwise logged. In at least one embodiment, any number of identification algorithms including, but not limited to, fuzzy logic identification algorithms, can be used to identify different variations of a keyword based at least in part on punctuation and/or spelling variations of the keyword or phrases.

For instance, in one embodiment, one example search device or process 116 can identify a candidate vertical subject on a web page using some or all of the following elements: (1) crawling the targeted web page and returning HTML (hypertext markup language) of interest; (2) searching the HTML for some or all subjects within a selected vertical domain model to identify candidate subjects (e.g., "Sting" on "www.verticalacuity.com"); and (3) determining whether the candidate subject on the webpage is actually the subject by factoring in one or more contextual features, for example, capitalization of the term in respect to capitalization of neighboring text, part of speech of the term within the sentence, emphasis added to the term on the page (i.e., blinking, bold, italics, variant font size, quotes, etc.), existence and proximity of associated subjects in the vertical domain model (e.g., "The Police" is within 4 words of "Sting"), count of the candidate subject on the page, natural frequency of the term within the vertical network (document frequency), and existence of common co-occurrences within the subject sentence associated with the type of subject ("performed" and "song" in same sentence as "Sting", a performer of songs).

Yet another data stream shown in FIG. 1 is click session data from a vertical clickstream mart 108 or data storage device. Using any number of collection and/or tracking processes and/or associated devices, click session data associated with one or more consumers can be obtained or otherwise received. In the embodiment shown in FIG. 1, at least one tracking and recording application module 126 can be implemented to receive and interpret data associated from one or more V-tags, such as tracking tag 128. A V-tag can be JavaScript™ or similar code that can be pre-placed or otherwise encoded on any webpage where consumer tracking is desired. After a webpage with a V-tag, such as tracking tag 128, is loaded by a consumer's Internet browser program, the tracking tag 128 can load additional JavaScript™ or similar code, also known as "server side code", in the background after the webpage has fired. In at least one embodiment, loading of the additional JavaScript™ or similar code can be relatively fault tolerant in the event one or more servers are unable to service the request, such that a consumer's experience on the website of interest is not impacted or otherwise interrupted. The additional JavaScript™ or similar code can record one or more session variables associated with a consumer's interactions with the website. Examples of session variables can include, but are not limited to, the URL of a webpage a consumer is viewing, the URL of a webpage a consumer navigated from, the engagement time in seconds for each webpage view and any searches a consumer performs using a website or webpage.

In addition to receiving click session data, the tracking and recording application module 126 can also receive third party supplementary data such as but not limited to geolocation, external sales data, and consumer demographics such as age data (collectively, third party data 130). Using any number of collection and/or tracking processes and/or associated devices, third party data 130 such as geolocation data associated with one or more consumers, or geolocation data previously stored in one or more data storage devices, can be obtained or otherwise received. Geolocation data can include, but is not limited to, IP (Internet Protocol) addresses, zip codes, area codes, and location coordinates. In the embodiment shown in FIG. 1, geolocation data can be one or more IP addresses associated with respective consumers accessing a network via an application program, such as an Internet browser.

Based at least in part on the information associated with one or more V-tags or tracking tags 128 and associated third party data 130 or geolocation data, the tracking and recording application module 126 can store some or all of the information and data in the vertical clickstream mart 108 or data storage device. The tracking and recording application module 126 may process some or all of such information and data prior to storage by interpreting the information received from JavaScript™ or similar code invoked by one or more V-tags or tracking tags 128. For example, some or all of the URLs associated with the V-tags or tracking tags 128 can be parsed by the tracking and recording application module 126 to determine one or more search terms within each respective URL string used to land or otherwise navigate a consumer to a webpage in which the V-tag or tracking tag was implemented. In one embodiment, the tracking and recording application module 126 may implement a classifier device or method to analyze one or more URLs to create a page type classification for the associated webpage as well as portions of the webpage crawled. For example, a classifier can be a page classifier 132 or other dynamic classifier device or method, which can determine a page type classification for a webpage based at least in part on one or more similarities in content size, existence and/or frequency of one or more vertical domain terms with previously classified webpages. In some instances, the functionality of a classifier device or method can be implemented by way of a processor, such as 226, a module, or other device or method, in which classification of a particular webpage may be inferred with a calculated confidence level in the inference. Example classifications can include, but are not limited to, a home page, an item details page, a discussion page, a blog page, a check-out page, and a photo section of a webpage. In any instance, data from the page classifier 132 can be stored or otherwise transmitted to a data mart 134 or other data storage device for subsequent retrieval. By way of another example, the tracking and recording application module 126 can utilize a geolocation reference database, shown as 238 in FIG. 2, or other data storage device, to match up a consumer's IP address with a particular geographic identifier, such as a zip code or area code. By way of further example, the tracking and recording application module 126 can normalize click session data, third party data 130, and/or geolocation data received from any number of websites implementing one or more V-tags, such as tracking tag 128, and accessible via a network, such as the Internet.

Each of the three data streams shown in FIG. 1 can be collected by or otherwise received by the data integration service module 102. By way of at least one transformation process, the data integration service module 102 can marry or otherwise utilize some or all of the data received. For example, data stored in the vertical clickstream mart 108 can be married with data stored in the landscape mart 104 by way of matching URLs or other unique identifiers for a particular consumer session. Since both the search device or method 116 and the tracking and recording application module 126 log URLs as part of their respective functions, the search device or method 116 obtaining URLs as part of identifying keyword occurrences and the tracking and recording application module 126 obtaining URLs as part of combining session data with third party data 130 such as geolocation data, marrying some or all of the data in the vertical clickstream mart 108 and the vertical landscape mart 104 can be facilitated.

After the data is processed by the data integration service module 102, the transformed data can be transmitted to and stored in a data mart 134 or similar data storage device. The data mart 134 or similar data storage device can be a database where some or all final, combined data sets are stored. The data sets in the data mart 134 or similar data storage device can be accessed by any number of application programs including, but not limited to, a reporting engine operable to generate one or more reports with data associated with at least one of the stored datasets.

Figure 11:
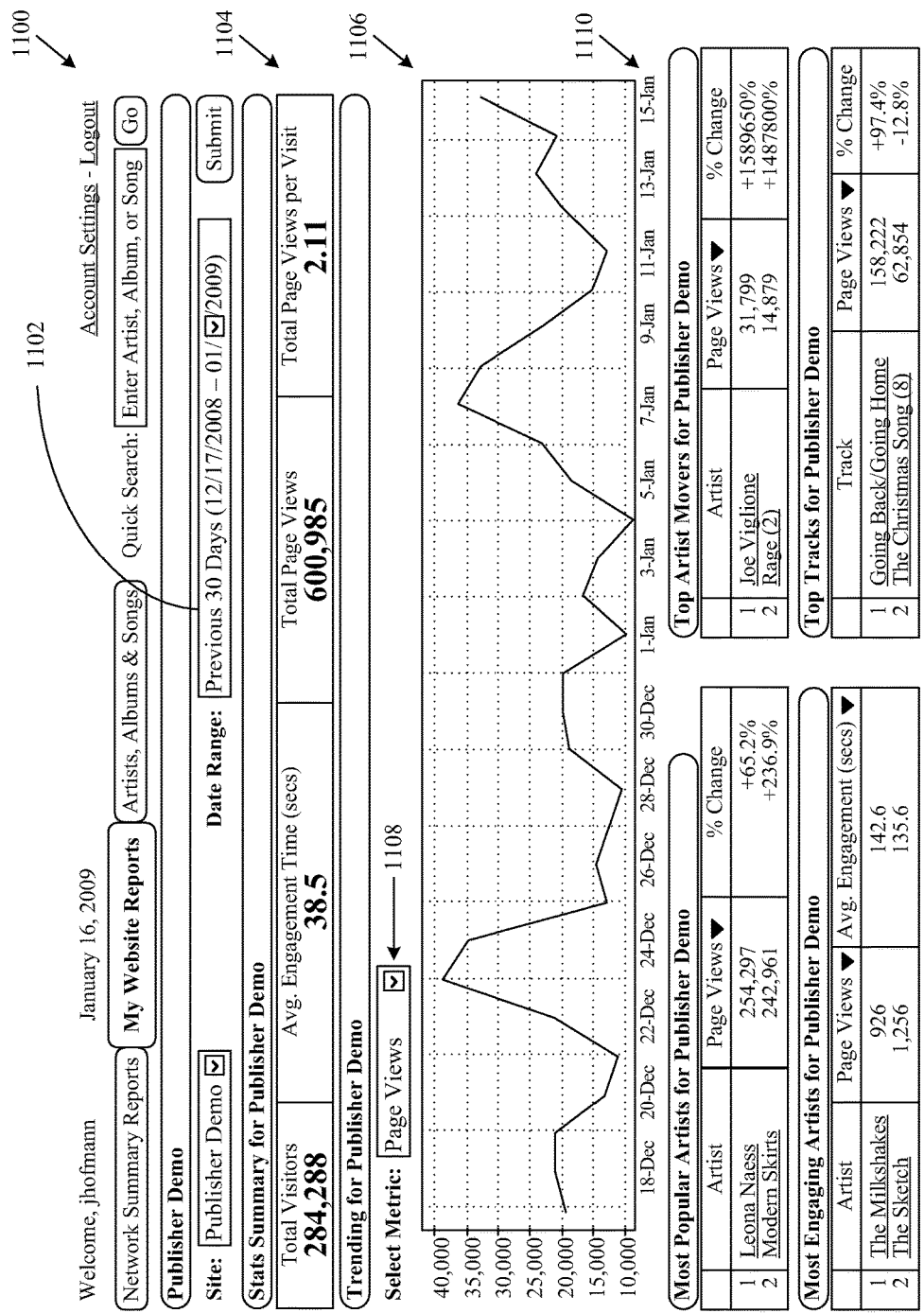
FIGS. 11-13 illustrate example webpages with results determined in accordance with embodiments of the invention.
Figure 12:
Figure 13:
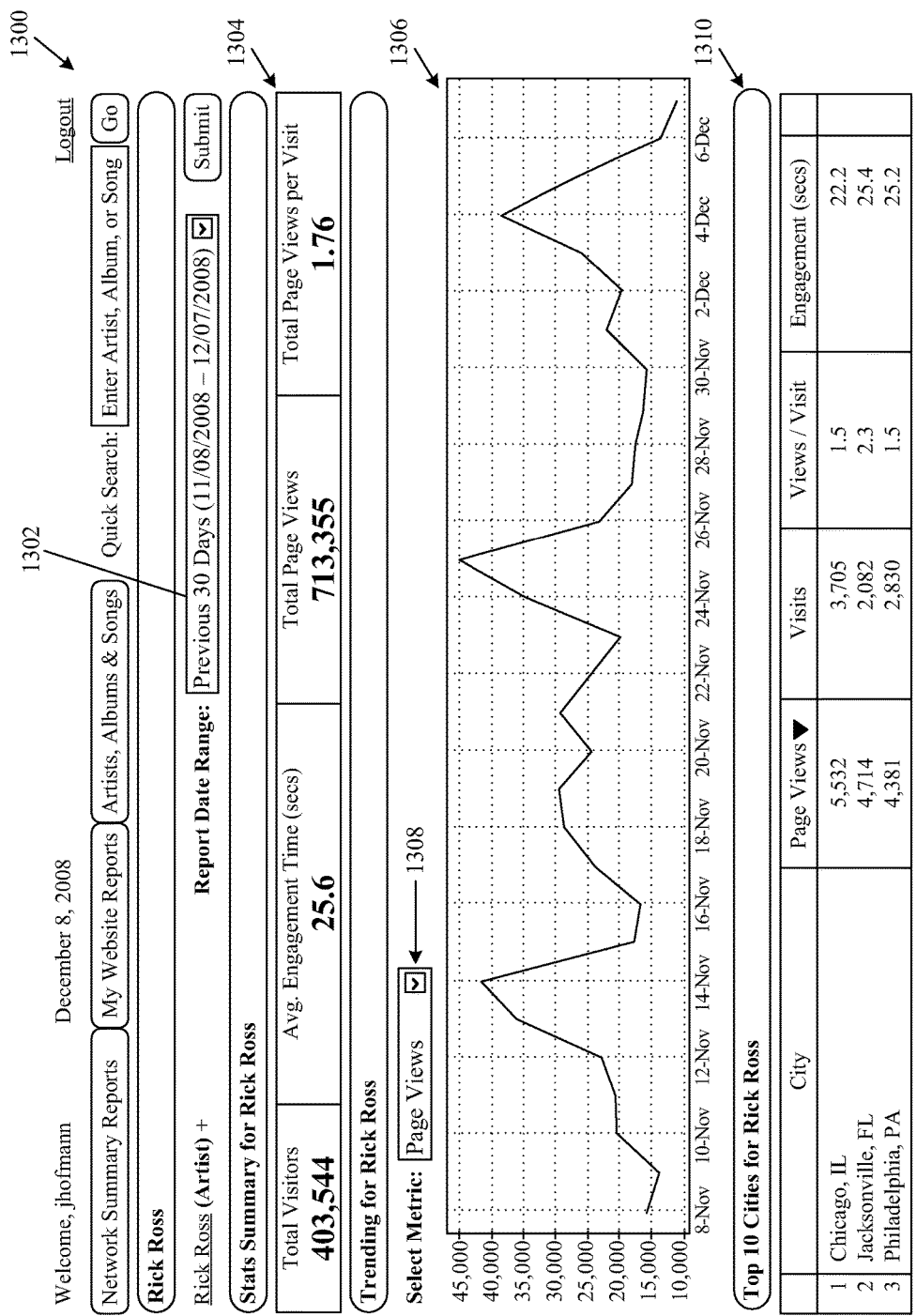

Various reports can be prepared for a user by a data integration service module 102, or other system component, from collected and analyzed data from the data flow 100 shown in FIG. 1 in accordance with an embodiment of the invention. Example reports can include, but are not limited to, peer group benchmarking, consumer traffic by search term, consumer traffic from within or outside of websites associated with a predefined vertical or industry, and results or trends associated with any aggregate consumer demand or usage data. Example results or trend data can include, but is not limited to, (1) occurrence—how many times does a product or brand appear and on what types of sites and pages; (2) geographies—in which geographic locations is a specific product or brand most popular based on consumer views of that product; (3) velocity—what is the growth rate of a product or brand being mentioned, as well as consumed (actual views), and on what types of pages; (4) engagement—how many seconds does a consumer remain engaged with a product or brand; (5) reach—how many consumers is a product or brand reaching during a given period of time; and (6) location—what types of web pages and sites does a product perform the best based on increases in page views or engagement time. Example reports, shown as webpages, with results or trend data determined in accordance with embodiments of the invention are illustrated in FIGS. 11-13.

Figure 2:
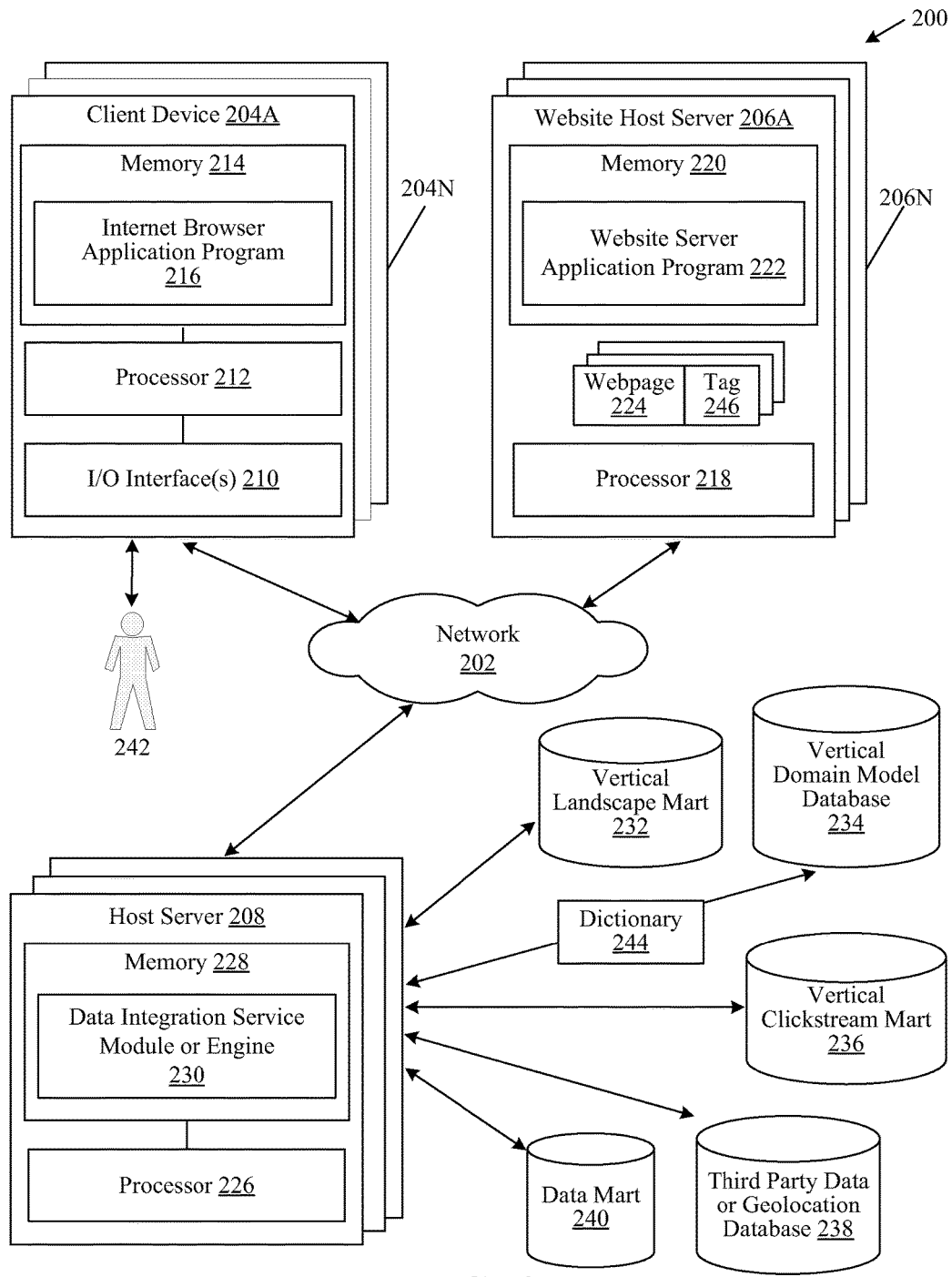
FIG. 2 illustrates an example system in accordance with an embodiment of the invention.

Embodiments of a data flow, such as 100, can be implemented with a consumer behavior analysis system, an example of which is shown in FIG. 2. Associated methods, processes, and associated sub-processes for identifying and measuring trends in consumer content demand within vertically associated websites are described by reference to FIGS. 3-10.

FIG. 2 illustrates an example environment and system in accordance with an embodiment of the invention. In this example, the environment can be a client-server configuration, and the system can be a consumer behavior analysis system. The system 200 is shown with a communications network 202, such as the Internet, in communication with at least one client device 204A. Any number of other client devices 204N can also be in communication with the network 202. The network 202 is also shown in communication with at least one website host server 206A. Any number of other website host servers 206N can also be in communication with the network 202. In addition, the network 202 is also shown in communication with at least one host server 208. Any number of other host servers can also be in communication with the network 202.

The communications network 202 shown in FIG. 2 can be, for example, the Internet. In another embodiment, the network 202 can be a wireless communications network capable of transmitting both voice and data signals, including image data signals or multimedia signals. Other types of communications networks, including local area networks (LAN), wide area networks (WAN), a public switched telephone network, or combinations thereof can be used in accordance with various embodiments of the invention.

Each client device 204A-N can be a computer or processor-based device capable of communicating with the communications network 202 via a signal, such as a wireless frequency signal or a direct wired communication signal. A respective communication or input/output interface 210 associated with each client device 204A-N can facilitate communications between the client device 204A-N and the network 202 or Internet. Each client device, such as 204A, can include a processor 212 and a computer-readable medium, such as a random access memory (RAM) 214, coupled to the processor 212. The processor 212 can execute computer-executable program instructions stored in memory 214. Computer executable program instructions stored in memory 214 can include an Internet browser application program, such as 216. The Internet browser application program can be adapted to access and/or receive one or more webpages and associated content from at least one remotely located website host server, such as 206A.

Each website host server 206A-N can be a computer or processor-based device capable of communicating with the communications network 202 via a signal, such as a wireless frequency signal or a direct wired communication signal. Each website host server, such as 206A, can include a processor 218 and a computer-readable medium, such as a random access memory (RAM) 220, coupled to the processor 218. The processor 218 can execute computer-executable program instructions stored in memory 220. Computer executable program instructions stored in memory 220 can include a website server application program, such as 222. The website server application program 222 can be adapted to transmit one or more webpages 224 and any associated content from the website host server 206A.

The host server 208 can be a computer or processor-based device capable of communicating with the communications network 202 via a signal, such as a wireless frequency signal or a direct wired communication signal. The host server 208 can include a processor 226 and a computer-readable medium, such as a random access memory (RAM) 220, coupled to the processor 228. The processor 226 can execute computer-executable program instructions stored in memory 228. Computer executable program instructions stored in memory 228 can include a data integration services module or engine, such as 230. The data integration services module or engine 230 can be adapted to receive and/or collect various data from any number of client devices 204A-N, website host servers 206A-N, and databases or data storage devices, such as 232-240. The data integration services module or engine 230 can be further adapted to transform or otherwise normalize some or all of the received and/or collected data according to any number of predefined algorithms or routines.

Generally, each of the memories 214, 220, 228, and data storage devices 232-240 can store data and information for subsequent retrieval. In this manner, the system 200 can store various received or collected information in memory associated with a client device, such as 204A, a website host server, such as 206A, a host server 208, or a database, such as 232-240. The memories 214, 220, 228, and databases 232-240 can be in communication with other databases, such as a centralized database, or other types of data storage devices. When needed, data or information stored in a memory or database may be transmitted to a centralized database capable of receiving data, information, or data records from more than one database or other data storage devices. The databases 232-240 shown in FIG. 2 include, but are not limited to, a vertical landscape mart 232. a vertical domain model database 234, a vertical clickstream mart 236, a third party data or geolocation database 238, and a data mart 240. In other embodiments, some or all of the databases can be integrated or distributed into any number of databases or data storage devices.

Suitable processors for a client device 204A-N, a website host server 206A-N, and a host server 208 may comprise a microprocessor, an ASIC, and state machines. Example processors can be those provided by Intel Corporation and Motorola Corporation. Such processors comprise, or may be in communication with media, for example computer-readable media, which stores instructions that, when executed by the processor, cause the processor to perform the elements described herein. Embodiments of computer-readable media include, but are not limited to, an electronic, optical, magnetic, or other storage or transmission device capable of providing a processor, such as the processor 212, 218, or 226, with computer-readable instructions. Other examples of suitable media include, but are not limited to, a floppy disk, CD-ROM, DVD, magnetic disk, memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 204A-N may also comprise a number of other external or internal devices such as a mouse, a CD-ROM, DVD, a keyboard, a display, or other input or output devices. As shown in FIG. 1, a client device such as 204A can be in communication with an output device via a communication or input/output interface, such as 210. Examples of client devices 204A-N are personal computers, mobile computers, handheld portable computers, digital assistants, personal digital assistants, cellular phones, mobile phones, smart phones, pagers, digital tablets, desktop computers, laptop computers, Internet appliances, and other processor-based devices. In general, a client device, such as 204A, may be any type of processor-based platform that is connected to a network, such as 202, and that interacts with one or more application programs. Client devices 204A-N may operate on any operating system capable of supporting a browser or browser-enabled application including, but not limited to, Microsoft Windows®, Apple OSX™, and Linux. The client devices 204A-N shown include, for example, personal computers executing a browser application program such as Microsoft Corporation's Internet Explorer™, Netscape Communication Corporation's Netscape Navigator™, and Apple's Safari™, and Mozilla Firefox™.

In one embodiment, suitable client devices can be standard desktop personal computers with Intel x86 processor architecture, operating a Microsoft® Windows® operating system, and programmed using a Java language.

Servers 206A and 208, each depicted as a single computer system, may be implemented as a network of computer processors. Examples of suitable servers are server devices, mainframe computers, networked computers, a processor-based device, and similar types of systems and devices.

A consumer, such as 242, can interact with a client device, such as 204A, via any number of input and output devices (not shown) such as an output display device, keyboard, and a mouse. In this manner, the consumer 242 can access one or more webpages 224 located on a website server host, such as 206A, via an Internet browser application program, such as 216, operating on a client device, such as 204A.

The data flow 100 shown in FIG. 1 can be implemented by the host server 208 operating in conjunction with various other components shown in FIG. 2. Instructions stored in either the processor 226 or the data integration services module or engine 230, or both, can facilitate some or all of the data streams described with respect to FIG. 1. For example, in one embodiment, the processor 226 can implement a crawl or search of one or more webpages 224 stored on any number of website host servers 206A-N. Job crawl data received by or otherwise collected by way of the crawl can be stored in a data storage device such as the vertical landscape mart 232 or similar database. By way of another example in one embodiment, the processor 226 can implement loading of one or more dictionaries 244 in a data storage device such as a vertical domain model database 234. In yet another example in one embodiment, the processor 226 can implement receiving click session data from one or more V-tags or tags 246 associated with any number of webpages 224 stored on at least one website host server, such as 206A, and being accessed or otherwise visited by at least one consumer, such as 242. The processor 226 can store the click session data in a data storage device such as a vertical clickstream mart 236 or similar database.

In the example embodiment shown, the data integration services module or engine 230 can be adapted to combine consumer session data with crawl job data, and store some or all of the data is a data storage device such as a data mart 240 or database. The data integration services module or engine 230 can be adapted to normalize some or all of the received and/or collected data using any number of algorithms or routines. The data integration or vertical transformation process can also be adapted to perform contextual analysis of certain keywords to track consumer content consumption at the keyword level using vertical or industry-specific dictionaries of keywords.

In one embodiment, a data integration services module or engine can utilize a third party data or geolocation database, such as 238, to determine third party data or location information associated with one or more URLs associated with a respective website, website host server address, network address, IP address, or client device IP address.

In any instance, certain combinations of consumer session data, crawl job data and/or third party data can be transformed by a data integration services module or engine, such as 230, to representative data for identifying and measuring trends in consumer content demand within a vertical network of websites and related content.

The system 200 can output or otherwise display one or more reports for a user via an output device, such as a printer, associated with a client device 204A-N or host server 208. In one embodiment, consumer behavior with respect to a predefined keyword can be printed on an output device, such as a printer (not shown), associated with a client device, such as 204A, for a user's benefit or consumption. In another embodiment, consumer behavior with respect to a predefined keyword can be displayed on an output device, such as a display (not shown), associated with a client device, such as 204A, for a user. Suitable types of output devices for users can include, but are not limited to, printers, printing devices, output displays, and display screens.

One may recognize the applicability of embodiments of the invention to other environments, contexts, and applications. One will appreciate that components of the system 200 shown in and described with respect to FIG. 2 are provided by way of example only. Numerous other operating environments, system architectures, and device configurations are possible. Accordingly, embodiments of the invention should not be construed as being limited to any particular operating environment, system architecture, or device configuration.

Embodiments of a system, such as 200, can facilitate identifying and measuring trends in consumer content demand within a vertical network of websites and related content. Unexpected improvements in identifying and measuring trends in consumer content demand within a vertical network of websites can be achieved by way of various embodiments of the system 200 described herein. Example methods and processes which can be implemented with the example data flow 100 and example system 200 are described by reference to FIGS. 3-10.

Figure 3:
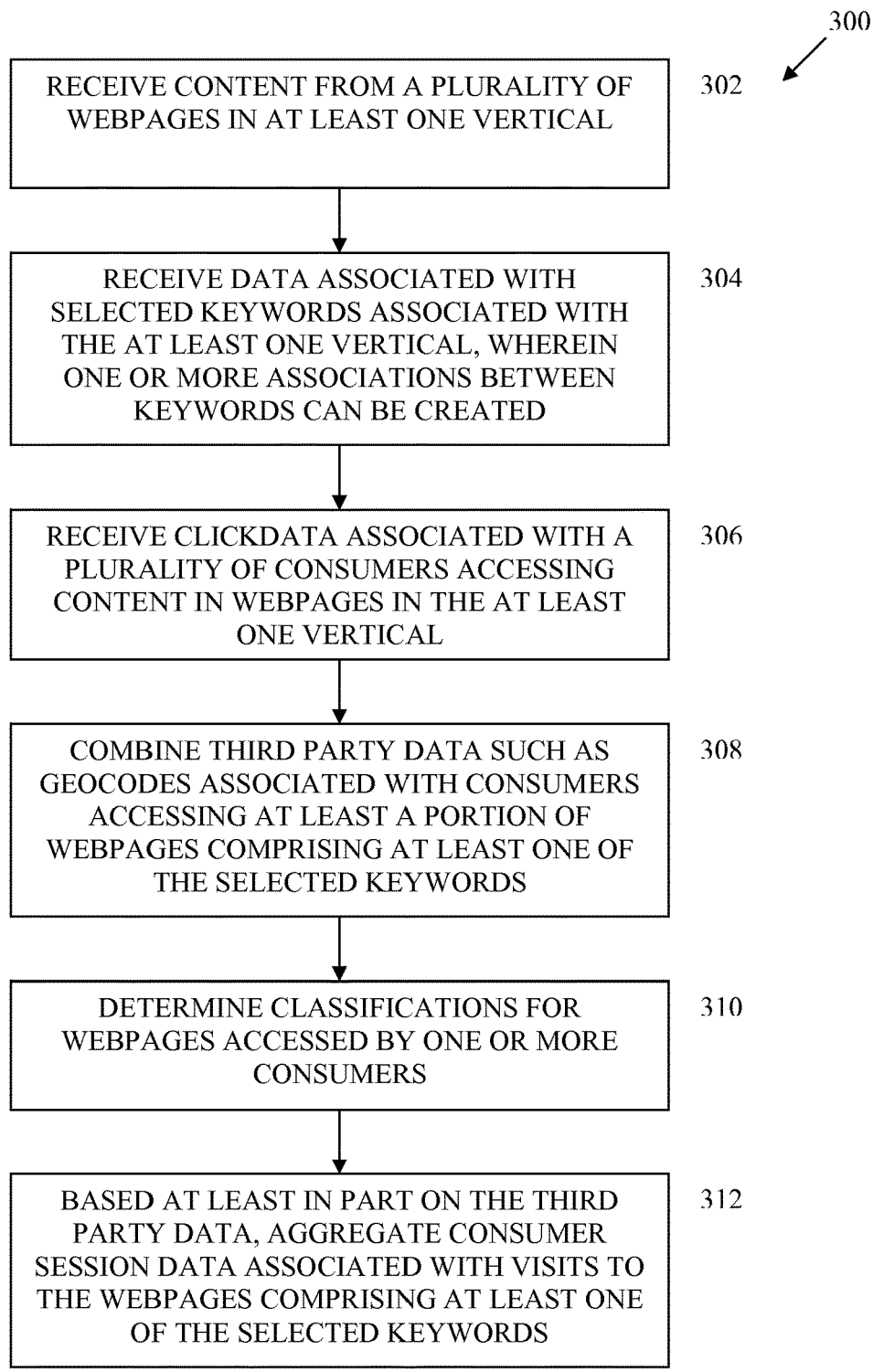
FIGS. 3-10 are process flowcharts illustrating example methods and data sub-flows in accordance with embodiments of the invention.

FIGS. 3-10 are process flowcharts illustrating example methods and sub-flows in accordance with embodiments of the invention. The example method 300 shown in FIG. 3 provides a method for identifying and measuring a trend in consumer content demand within vertically associated websites in accordance with an embodiment of the invention. The method 300 can be implemented by various data flows and components shown in FIG. 1, or a system, such as 200 of FIG. 2

The method 300 begins at block 302. In block 302, content is received from a plurality of webpages in at least one vertical. In the embodiment shown, a crawler such as 112 in FIG. 1 or processor such as 226 in FIG. 2 can crawl content from a plurality of webpages in at least one vertical.

In one aspect of one embodiment, the at least one vertical can include at least one of the following: automobile industry, a type of vehicle, consumer product industry, a type of consumer product, entertainment, a type of entertainment, music industry, a type of music, motion pictures, a type of motion picture, pharmaceuticals, a type of pharmaceutical, clothing or apparel industry, a type of clothing or apparel, financial products and services, and a type of financial product or service.

Block 302 is followed by block 304, in which data associated with a plurality of selected keywords associated with the at least one vertical is received, wherein one or more associations between at least a portion of the plurality of selected keywords, such as vertical dictionary keywords, can be generated. In the embodiment shown, a processor such as 226 in FIG. 2 can receive data associated with a plurality of selected keywords associated with the at least one vertical, and generate one or more associations between at least a portion of the plurality of selected keywords, such as vertical dictionary keywords.

Block 304 is followed by block 306, in which clickdata or session data associated with a plurality of consumers accessing content in webpages in the at least one vertical is received. In this embodiment, a tracking and recording application module, such as 126 in FIG. 1 or a processor such as 226 in FIG. 2 can receive session data associated with a plurality of consumers accessing content in webpages in the at least one vertical.

In one aspect of one embodiment, clickdata or session data can include at least one of the following: a uniform resource locator, an Internet protocol (IP) address, alphanumeric text input by a consumer, a browser type, time associated with a consumer activity in accessing or requesting content from a webpage or a website, and any combination thereof.

Block 306 is followed by block 308, in which third party data such as geocodes associated with consumers accessing at least a portion of webpages comprising at least one of the selected keywords are determined. In the embodiment shown, a tracking and recording application module, such as 126 in FIG. 1 or a processor such as 226 in FIG. 2 can determine third party data associated with the plurality of consumers accessing at least a portion of webpages comprising at least one of the selected keywords.

In one aspect of one embodiment, third part data can include at least one of the following: geolocation data, external sales data, consumer demographic information, consumer age data, IP (Internet Protocol) address, zip code, area code, location coordinate, geocode, and any combination thereof.

Block 308 is followed by block 310, in which at least one webpage classification is determined for some or all of the portion of webpages accessed by one or more consumers or comprising at least one of the selected keywords. In the embodiment shown, a page classifier such as 132 in FIG. 1 or a processor such as 226 in FIG. 2 can determine at least one classification for some or all of the portion of webpages accessed by one or more consumers or comprising at least one of the selected keywords.

In one aspect of one embodiment, the method 300 can include determining at least one classification for some or all of the portion of webpages accessed by at least some of the plurality of consumers or comprising at least one of the selected keywords, wherein the at least one classification can be used to generate at least one report comprising a statistic associated with the at least one vertical.

Block 310 is followed by block 312, in which consumer session data associated with visits to the webpages comprising at least one of the selected keywords is aggregated based at least in part on the third party data. In the embodiment shown, a data integration service such as 102 in FIG. 1 or a data integration service module such as 230 in FIG. 2 can aggregate, based at least in part on the third party data, session data associated with visits to the webpages comprising at least one of the selected keywords.

In one aspect of one embodiment, the method 300 can include combining crawled content with session data by matching uniform resource locators for a particular consumer session.

In one aspect of one embodiment, the method 300 can include outputting at least one report comprising a statistic associated with the at least one vertical.

The method 300 of FIG. 3 ends after block 312.

Figure 4:
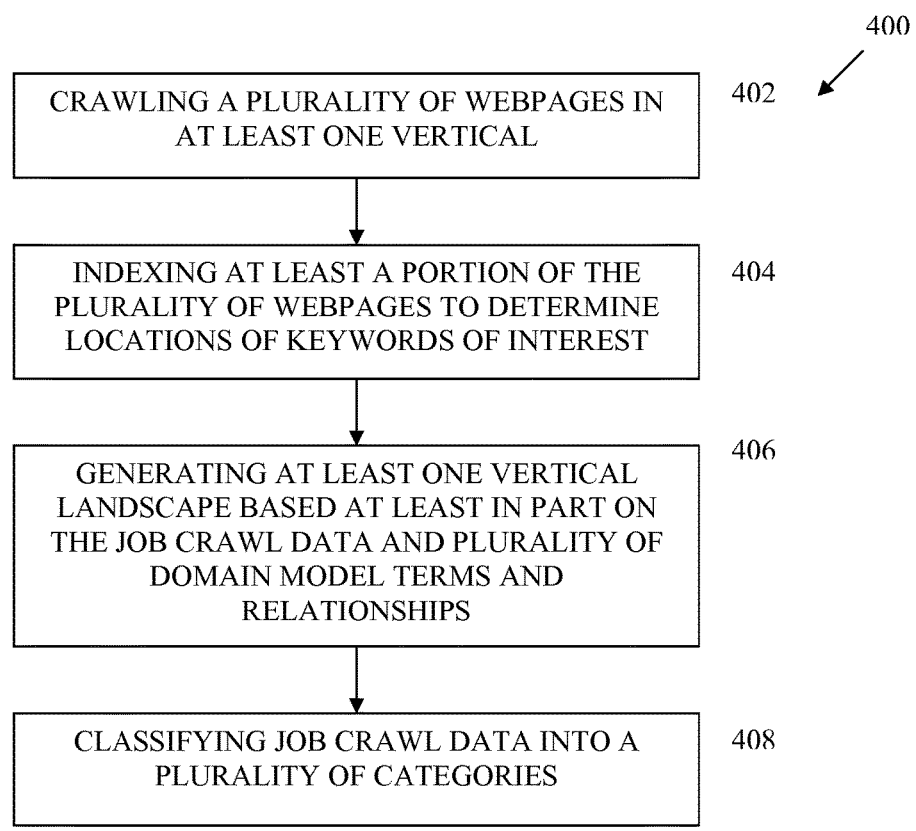

The example method 400 shown in FIG. 4 provides a method for identifying and measuring trends in consumer content demand within vertically associated websites in accordance with an embodiment of the invention. The method 400 can be implemented by various data flows and components shown in FIG. 1, or a system, such as 200 of FIG. 2.

The method 400 begins at block 402. In block 402, a plurality of webpages in at least one vertical are crawled.

Block 402 is followed by block 404, in which at least a portion of the plurality of webpages is indexed to determine locations of keywords of interest.

Block 404 is followed by block 406, in which at least one vertical domain model and associated relationships between elements in the at least one vertical domain model are generated.

Block 406 is followed by block 408, in which at least one vertical landscape is generated based at least in part on the crawl and the at least one vertical domain models and associated relationships.

Block 408 is followed by block 410, in which at least a portion of the plurality of webpages is classified into one or more categories.

The method 400 of FIG. 4 ends after block 410.

Figure 5:
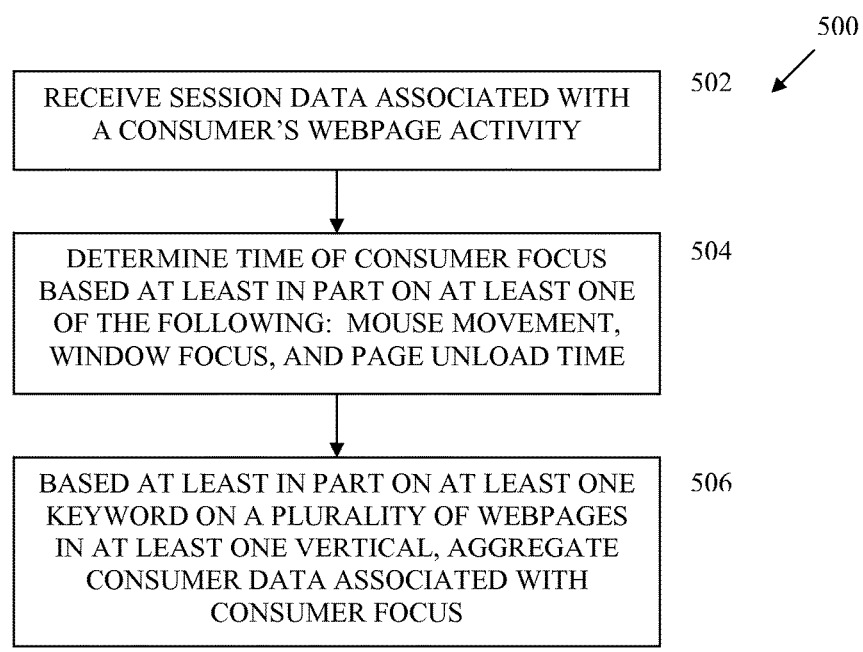

The example method 500 shown in FIG. 5 provides another method for identifying and measuring trends in consumer content demand within vertically associated websites in accordance with an embodiment of the invention. The method 500 can be implemented by various data flows and components shown in FIG. 1, or a system, such as 200 of FIG. 2.

The method 500 begins at block 502. In block 502, session data associated with a consumer's webpage activity is received. In the embodiment shown, a data integration service such as 102 in FIG. 1 or a data integration service module such as 230 in FIG. 2, can aggregate, based at least in part on the third party data, session data associated with visits to the webpages comprising at least one of the selected keywords.

In one aspect of one embodiment, a crawler such as 112 in FIG. 1 or a processor such as 226 in FIG. 2 can crawl content from a plurality of webpages in at least one vertical, and the processor 226 can identify at least one keyword on the plurality of webpages in the at least one vertical.

Block 502 is followed by block 504, in which time of consumer focus is determined based at least in part on at least one of the following: mouse movement, window focus, and page unload time. In the embodiment shown, a tracking and recording application module, such as 126 in FIG. 1 or a processor such as 226 in FIG. 2 can determine time of consumer focus based at least in part on at least one of the following: mouse movement, window focus, and page unload time.

Block 504 is followed by block 506, in which consumer data associated with consumer focus is aggregated based at least in part on at least one keyword on a plurality of webpages in at least one vertical. In the embodiment shown, a data integration service such as 102 in FIG. 1 or a data integration service module such as 230 in FIG. 2 can aggregate consumer data associated with consumer focus based at least in part on at least one keyword on a plurality of webpages in at least one vertical.

The method 500 of FIG. 5 ends after block 506.

FIGS. 6-10 illustrate example processes and sub-flows in accordance with another embodiment of the invention. Each of the respective methods or sub-flows 600, 700, 800, 900, 1000 can be implemented by one or more components shown in FIG. 1, or a system, such as 200 of FIG. 2.

Figure 6:
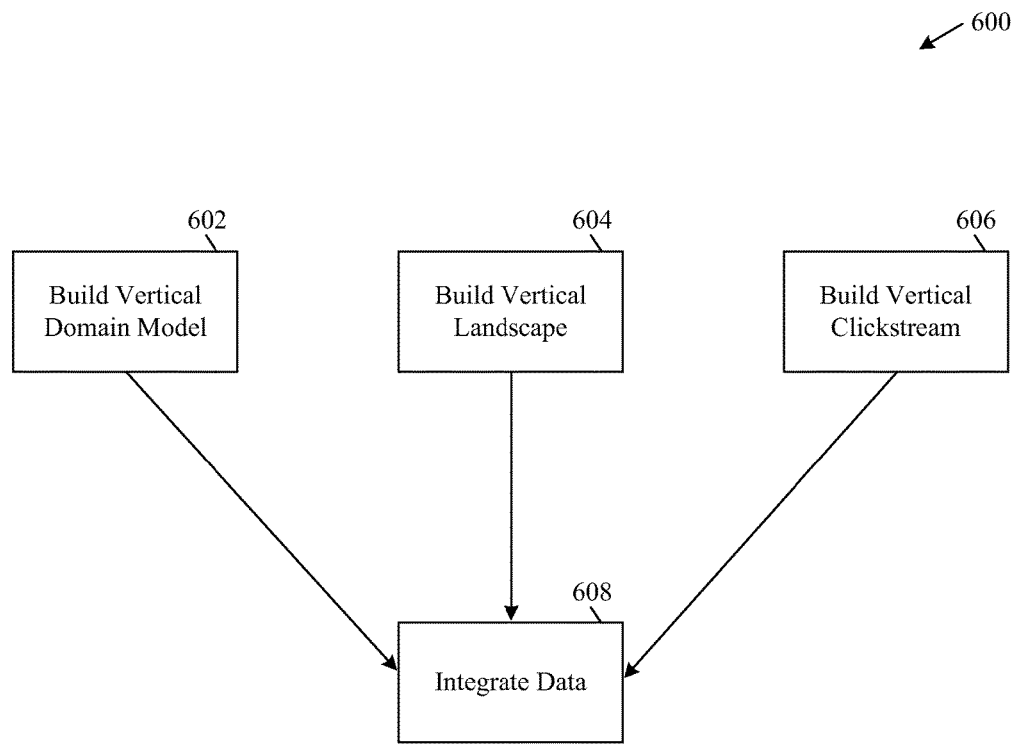

The example method 600 shown in FIG. 6 provides data flow for a method for identifying and measuring trends in consumer content demand within vertically associated websites in accordance with an embodiment of the invention. The method 600 can be implemented by various data flows and components shown in FIG. 1, or a system, such as 200 of FIG. 2.

The method 600 begins at block 602. In block 602, a vertical domain model is built or otherwise generated.

In block 604, a vertical landscape is built or otherwise generated.

In block 606, a vertical clickstream is built or otherwise generated.

In block 608, data from some or all of block 602, 604, and 606 is integrated.

The method 600 ends after block 608.

Figure 7:
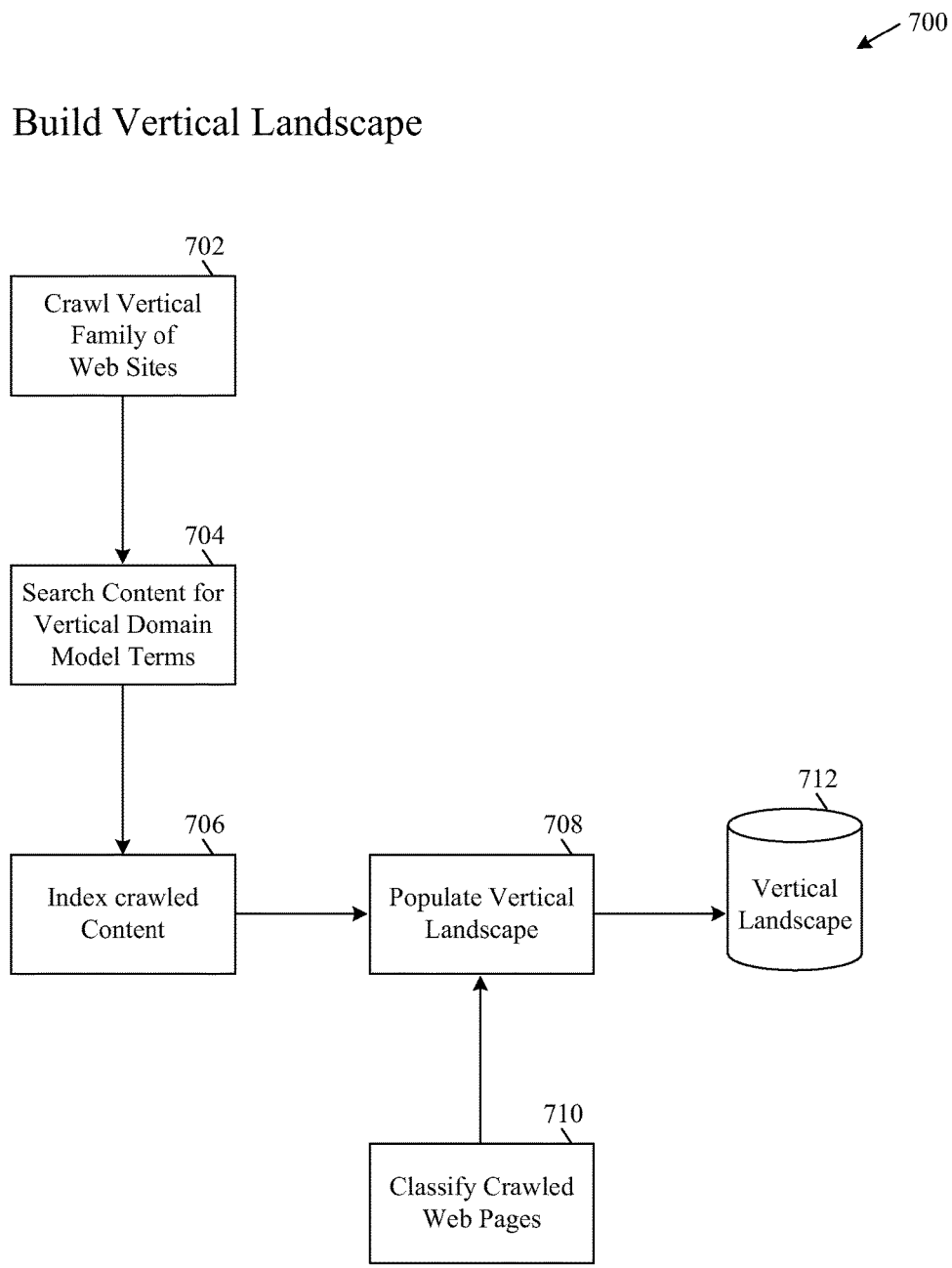

The example method 700 shown in FIG. 7 provides a sub-flow for a method for identifying and measuring trends in consumer content demand within vertically associated websites in accordance with an embodiment of the invention. In particular, the method 700 illustrates one example of building or generating a vertical landscape mart or database in accordance with an embodiment of the invention. The method 700 can be implemented by various data flows and components shown in FIG. 1, or a system, such as 200 of FIG. 2.

The method 700 begins at block 702. In block 702, a vertical family of websites in crawled.

In block 704, content is searched for vertical domain model terms.

In block 706, a crawled content is indexed.

In block 708, a vertical landscape is populated.

In block 710, crawled webpages are classified.

In block 712, a vertical landscape mart or database is generated.

The method 700 ends after block 712.

Figure 8:
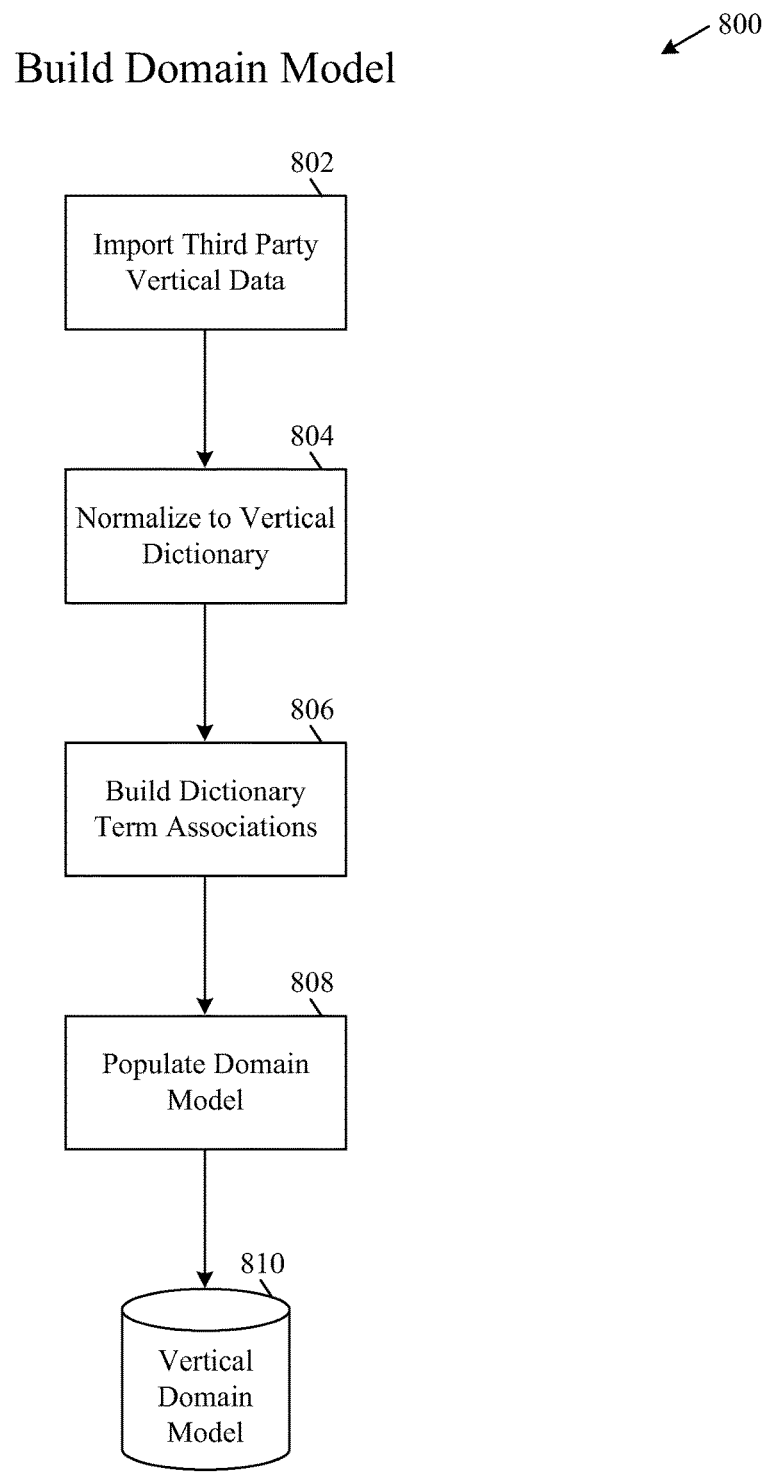

The example method 800 shown in FIG. 8 provides a sub-flow for a method for identifying and measuring trends in consumer content demand within vertically associated websites in accordance with an embodiment of the invention. In particular, the method 800 illustrates one example of building or generating a vertical domain model mart or database in accordance with an embodiment of the invention. The method 800 can be implemented by various data flows and components shown in FIG. 1, or a system, such as 200 of FIG. 2.

The method 800 begins at block 802. In block 802, third party vertical data is imported.

In block 804, the third party data is normalized to a vertical dictionary.

In block 806, dictionary term associations are built or otherwise generated.

In block 808, a domain model is populated.

In block 810, a vertical domain model mart or database is generated.

The method 800 ends after block 810.

Figure 9:
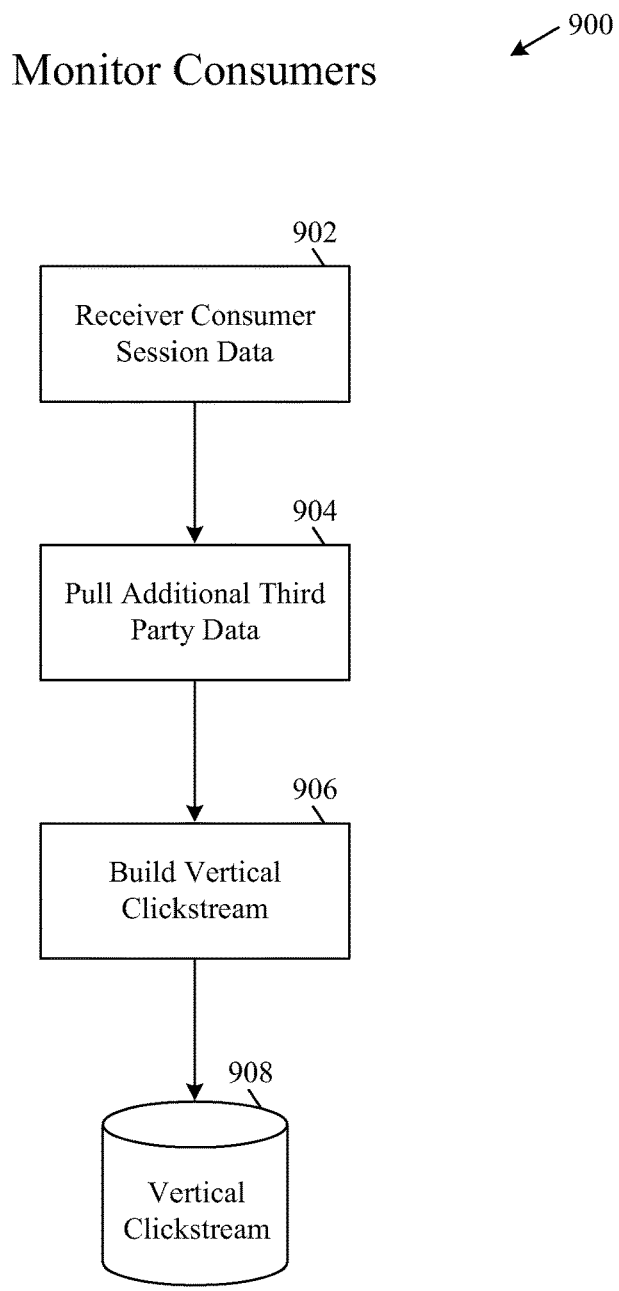

The example method 900 shown in FIG. 9 provides a sub-flow for a method for identifying and measuring trends in consumer content demand within vertically associated websites in accordance with an embodiment of the invention. In particular, the method 900 illustrates one example of monitoring consumer behavior in accordance with an embodiment of the invention. The method 900 can be implemented by various data flows and components shown in FIG. 1, or a system, such as 200 of FIG. 2.

The method 900 begins at block 902. In block 902, consumer session data is received.

In block 904, additional third party data can be pulled or otherwise obtained.

In block 906, a vertical clickstream mart or database is built or otherwise generated.

In block 908, data for the vertical clickstream mart or database is stored.

The method 900 ends after block 908.

Figure 10:
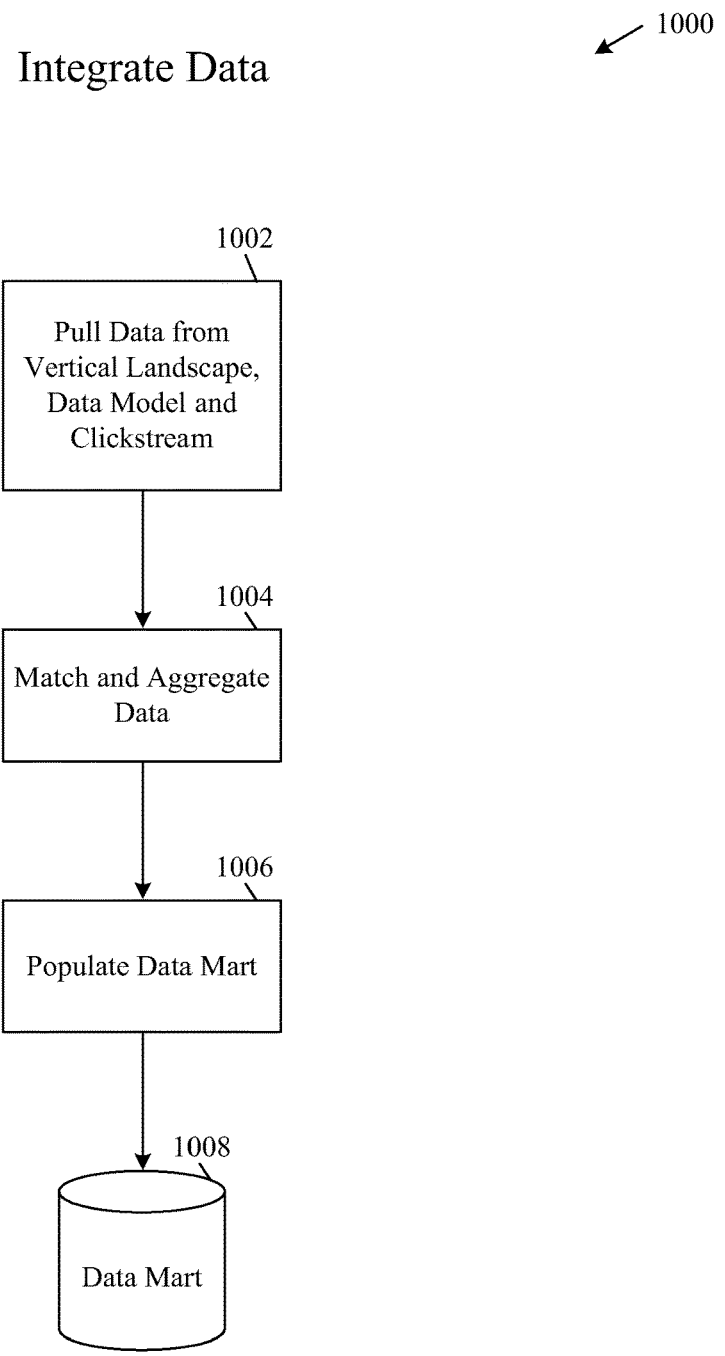

The example method 1000 shown in FIG. 10 provides a sub-flow for a method for identifying and measuring trends in consumer content demand within vertically associated websites and related content in accordance with an embodiment of the invention. In particular, the method 1000 illustrates one example of integrating data in accordance with an embodiment of the invention. The method 1000 can be implemented by various data flows and components shown in FIG. 1, or a system, such as 200 of FIG. 2.

The method 1000 begins at block 1002. In block 1002, data from a vertical landscape, data model, and clickstream mart or database are pulled or otherwise received.

In block 1004, some or all of the data is matched and aggregated.

In block 1006, a data mart or database is populated or otherwise generated.

In block 1008, data for the data mart or database is stored.

The method 1000 ends after block 1008

The example elements of FIGS. 3-10 are shown by way of example, and other process and sub-flow embodiments can have fewer or greater numbers of elements, and such elements can be arranged in alternative configurations in accordance with other embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, a special purpose computer such as a switch, or other programmable data processing apparatus to produce a machine, such that the instructions which execute on the computer or other programmable data processing apparatus create means for implementing the functions specified in the flowchart block or blocks. In certain instances, these computer program instructions, when executed by a computer or system, such as shown in FIG. 2, may form a special purpose computer for identifying and measuring trends in consumer content demand within vertically associated websites and related content.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational elements or steps to be performed on the computer or other programmable apparatus to produce a computer implemented process such that the instructions that execute on the computer or other programmable apparatus provide elements for implementing the functions specified in the flowchart block or blocks.

Accordingly, blocks of the block diagrams and flowchart illustrations support combinations of means for performing the specified functions, combinations of elements for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions, elements, or combinations of special purpose hardware and computer instructions.

FIGS. 11-13 illustrate example webpages with results determined in accordance with embodiments of the invention. The webpages 1100, 1200, 1300 shown in respective FIGS. 11-13 and associated reporting content can be generated by the various data flows and components shown in FIG. 1, or a system, such as 200 of FIG. 2. The webpages and associated reporting content is shown by way of example and is not intended to be limiting.

In FIG. 11, the webpage 1100 shown includes a report for a particular website, such as a publisher demo website. In this example, a particular date range for the report can be selected by pulldown menu 1102, for instance, the previous 30 days. A summary of various statistical data characterizing visiting consumers to the particular website of interest can be determined and displayed in the upper portion 1104 of the report. For example, statistical data can include, but is not limited to, total number of visitors, average engagement time, total number of page views, and total page views per visit. In an intermediate portion 1106 of the report, a graphical chart of selected statistical data or other metric can be determined and displayed. In this example, a certain statistic or metric can be selected by an additional pulldown menu 1108, for instance, number of page views. The selected statistical data shown in the graphical chart can be the daily number of page views over a particular date range such as the previous 30 days. A lower portion 1110 of the report can include any number of statistical data summaries including, but not limited to, the most popular artists for the particular website, the top artist movers for the particular website, the most engaging artists for the particular website, and the top tracks for the particular website. In any number of the statistical data summaries for a report, artist names, album or track names, page views, percentage change over a period of time, and average engagement time can be determined and displayed. In accordance with other embodiments, other similar reports can be generated and displayed for a particular website of interest including, but not limited to, reports based at least in part on top artists, top albums, top tracks, hyper artists, hyper albums, and hyper tracks.

In FIG. 12, the webpage 1200 shown includes a report for a particular network of interest, such as a series of vertically associated websites and related content. In this example, a particular date range for the report can be selected by pulldown menu 1202, for instance, the previous 7 days. An additional pulldown menu 1204 can provide a particular genre selection, for instance, R&B. A summary of various statistical data characterizing any number of artists ranked by total number of visitors, average engagement time, total number of page views, total page views per visit, and percentage changes in some or all of the foregoing over a predefined period of time can be determined and displayed in a lower portion 1206 of the report. In accordance with other embodiments, other similar reports can be generated and displayed for a particular network of interest including, but not limited to, reports based at least in part on top artists, top albums, top tracks, hyper artists, hyper albums, and hyper tracks.

In FIG. 13, the webpage 1300 shown includes a report for a particular artist of interest. In this example, a particular date range for the report can be selected by pulldown menu 1302, for instance, the previous 30 days. A summary of various statistical data characterizing visiting consumers selecting or indicating interest in the particular artist can be determined and displayed in the upper portion 1304 of the report. For example, statistical data can include, but is not limited to, total number of visitors, average engagement time, total number of page views, and total page views per visit. In an intermediate portion 1306 of the report, a graphical chart of selected statistical data or other metric can be determined and displayed. In this example, a certain statistic or metric can be selected by an additional pulldown menu 1308, for instance, number of page views. The selected statistical data shown in the graphical chart can be the daily number of page views over a particular date range such as the previous 30 days. A lower portion 1310 of the report can include any number of statistical data summaries including, but not limited to, the top cities interested in the particular artist. In any number of the statistical data summaries for a report, city names, album or track names, total number of page views, total number of visits, total page views per visit, average engagement time, and percentage change of some or all of the foregoing over a predefined period of time can be determined and displayed. In accordance with other embodiments, other similar reports can be generated and displayed for a particular artist of interest including, but not limited to, reports based at least in part on consumer traffic, geography, content item search results, content breakdown, related artists, and search terms.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method comprising:
receiving, from a crawler application program, a first data stream comprising crawled content pertaining to a plurality of webpages associated with a vertical, the crawled content comprising keywords and locations for the keywords, wherein the crawler application program comprises instructions to extract the crawled content from a set of uniform resource locator (URL) fragments;
receiving, by a processor of a server, a second data stream comprising expert data associated with one or more predetermined keywords pertaining to the vertical, the expert data comprising one or more inferences associated with relationships between the one or more predetermined keywords, the one or more inferences drawn prior to identifying one or more of the predetermined keywords in the crawled content;
identifying at least one predetermined keyword in the crawled content to determine respective locations and a number of occurrences for the at least one predetermined keyword within the crawled content;
associating crawled content from the plurality of webpages with a third data stream comprising user activity data pertaining to a plurality of user computing devices accessing the plurality of webpages;
filtering, from the user activity data, a first set of activity data indicating a user is no longer viewing a set of webpages comprising the at least one predetermined keyword, wherein the filtering generates a second set of activity data;
receiving a fourth data stream comprising at least one of third party geolocation or demographic data associated with the plurality of consumers accessing at least a portion of the plurality of webpages comprising the at least one of the predetermined keywords;
determining one or more associations between the at least one of the third party geolocation or the demographic data and the at least one of the predetermined keywords in the crawled content;
transforming the first data stream, the second data stream, the third data stream and the fourth data stream to be indexed in a first database, wherein the first data stream, the second data stream, the third data stream and the fourth data stream are collected from different sources;
associating the second set of user activity data and the at least one of the third party geolocation or the demographic data based at least in part on the respective locations for the at least one predetermined keyword in the first database for identifying and measuring a trend in consumer content demand;
determining, using the first database, one or more vertical metrics of at least one of a product or a brand associated with the vertical;
collecting, from a plurality of input devices associated with the plurality of user computing devices, data corresponding to movement of the plurality of input devices;
determining an amount of interaction time of the plurality of user computing devices with one or more webpages corresponding to the one or more vertical metrics;
filtering, by the processor of the server, the one or more vertical metrics in view of the amount of interaction time to generate a filtered list of vertical metrics; and
displaying a report comprising the filtered list of vertical metrics and the amount of interaction time corresponding to each of the vertical metrics.

2. The method of claim 1, further comprising:
matching one or more first URLs associated with the at least one of the third party geolocation or the demographic data with one or more second URLs associated with the one or more predetermined keywords.

3. The method of claim 1, further comprising:
determining a classification of at least a portion of one of the plurality of webpages to generate the report comprising a statistic associated with the vertical.

4. The method of claim 1, wherein the vertical is associated with at least one of an automobile industry, a type of vehicle, a consumer product industry, a type of consumer product, an entertainment industry, a type of entertainment, a music industry, a type of music, a motion picture industry, a type of motion picture, a pharmaceuticals industry, a type of pharmaceutical, an apparel industry, a type of apparel, a financial products industry, a financial services industry, a type of financial product, or a type of financial service.

5. The method of claim 1, wherein the user activity data comprises at least one of a first URL, an Internet protocol (IP) address, alphanumeric text, a browser type, or a time associated with a consumer activity.

6. A system comprising:
a memory to store instructions; and
a processor operatively coupled to the memory, the processor to execute the instructions to:
receive, from a crawler application program, a first data stream comprising crawled content pertaining to a plurality of webpages associated with a vertical, the crawled content comprising keywords and locations for the keywords, wherein the crawler application program comprises instructions to extract the crawled content from a set of uniform resource locator (URL) fragments;
receive a second data stream comprising expert data associated with one or more predetermined keywords pertaining to the vertical, the expert data comprising one or more inferences associated with relationships between the one or more predetermined keywords, the one or more inferences drawn prior to identifying one or more of the predetermined keywords in the crawled content;

identify at least one predetermined keyword in the crawled content to determine respective locations and a number of occurrences for the at least one predetermined keyword within the crawled content;

associate crawled content from the plurality of webpages with a third data stream comprising user activity data pertaining to a plurality of user computing devices accessing the plurality of webpages;

filter, from the user activity data, a first set of activity data indicating a user is no longer viewing a set of webpages comprising the at least one predetermined keyword, wherein the filtering generates a second set of activity data;

receive a fourth data stream comprising third party geolocation or demographic data associated with the plurality of consumers accessing at least a portion of the plurality of webpages comprising the at least one of the predetermined keywords;

determine one or more associations between the third party geolocation or demographic data and the at least one of the predetermined keywords in the crawled content;

transform the first data stream, the second data stream, the third data stream and the fourth data stream to be indexed in a first database, wherein the first data stream, the second data stream, the third data stream and the fourth data stream are collected from different sources;

associate the second set of user activity data and the third party geolocation or demographic data based at least in part on the respective locations for the at least one predetermined keyword in the first database for identifying and measuring a trend in consumer content demand;

determine, using the database, one or more vertical metrics of at least one of a product or a brand associated with the one or more vertical metrics;

collect, from a plurality of input devices associated with the plurality of user computing devices, data corresponding to movement of the plurality of input devices;

determine an amount of interaction time of the plurality of user computing devices with one or more webpages corresponding to the one or more vertical metrics;

filter the one or more vertical metrics in view of the amount of interaction time to generate a filtered list of vertical metrics, wherein the filter improves processing based on analysis of the interaction time as a function of the one or more vertical metrics; and display a report comprising the amount of interaction time corresponding to each of the one or more vertical metrics.

7. The system of claim 6, the processor to execute the instructions to: match one or more first URLs associated with the at least one of the third party geolocation or the demographic data with one or more second URLs associated with the one or more predetermined keywords.

8. The system of claim 6, the processor to execute the instructions to determine a classification of at least a portion of one of the plurality of webpages to generate the report comprising a statistic associated with the vertical.

9. The system of claim 6, wherein the vertical relates to at least one of an automobile industry, a type of vehicle, a consumer product industry, a type of consumer product, an entertainment industry, a type of entertainment, a music industry, a type of music, a motion picture industry, a type of motion picture, a pharmaceuticals industry, a type of pharmaceutical, an apparel industry, a type of apparel, a financial products industry, a financial services industry, a type of financial product, or a type of financial service.

10. The system of claim 6, wherein the user activity data comprises at least one of a first URL, an Internet protocol (IP) address, alphanumeric text, a browser type, or a time associated with a consumer activity.

11. The system of claim 6, wherein the third party demographic data comprises at least one external sales data, consumer demographic information, consumer age data, IP (Internet Protocol) address, zip code, area code, location coordinate, or geocode.

12. The system of claim 6, the processor to execute the instructions to receive data from a tracking tag associated with one of the plurality of webpages.

13. The system of claim 6, the processor to execute the instructions to normalize the user activity data.

14. A non-transitory computer readable storage medium comprising instructions that, when executed by a processor, cause the processor to:

receive, from a crawler application program, a first data stream comprising crawled content pertaining to a plurality of webpages associated with a vertical, the crawled content comprising keywords and locations for the keywords, wherein the crawler application program comprises instructions to extract the crawled content from a set of uniform resource locator (URL) fragments;

receive a second data stream comprising expert data associated with one or more predetermined keywords pertaining to the vertical, the expert data comprising one or more inferences associated with relationships between the one or more predetermined keywords, the one or more inferences drawn prior to identifying one or more of the predetermined keywords in the crawled content;

identify at least one predetermined keyword in the crawled content to determine respective locations and a number of occurrences for the at least one predetermined keyword within the crawled content;

associate crawled content from the plurality of webpages with a third data stream comprising user activity data pertaining to a plurality of user computing devices accessing the plurality of webpages;

filter, from the user activity data, a first set of activity data indicating a user is no longer viewing a set of webpages comprising the at least one predetermined keyword, wherein the filtering generates a second set of activity data;

receive a fourth data stream comprising third party geolocation or demographic data associated with the plurality of consumers accessing at least a portion of the plurality of webpages comprising the at least one of the predetermined keywords;

determine one or more associations between the third party geolocation or demographic data and the at least one of the predetermined keywords in the crawled content;

transform the first data stream, the second data stream, the third data stream and the fourth data stream to be indexed in a first database, wherein the first data stream, the second data stream, the third data stream and the fourth data stream are collected from different sources;

associate the second set of user activity data and the third party geolocation or demographic data based at least in part on the respective locations for the at least one predetermined keyword in the first database for identifying and measuring a trend in consumer content demand;

determine, using the database, one or more vertical metrics of at least one of a product or a brand associated with the one or more vertical metrics;

collect, from a plurality of input devices associated with the plurality of user computing devices, data corresponding to movement of the plurality of input devices;

determine an amount of interaction time of the plurality of user computing devices with one or more webpages corresponding to the one or more vertical metrics;

filter the one or more vertical metrics in view of the amount of interaction time to generate a filtered list of vertical metrics, wherein the filter improves processing based on analysis of the interaction time as a function of the one or more vertical metrics; and display a report comprising the amount of interaction time corresponding to each of the one or more vertical metrics.

15. The non-transitory computer readable storage medium of claim 14, wherein the vertical relates to at least one of an automobile industry, a type of vehicle, a consumer product industry, a type of consumer product, an entertainment industry, a type of entertainment, a music industry, a type of music, a motion picture industry, a type of motion picture, a pharmaceuticals industry, a type of pharmaceutical, an apparel industry, a type of apparel, a financial products industry, a financial services industry, a type of financial product, or a type of financial service.

* * * * *